US012395302B2

(12) United States Patent
Mozaffari et al.

(10) Patent No.: US 12,395,302 B2
(45) Date of Patent: Aug. 19, 2025

(54) CORESET ENHANCEMENT FOR REDUCED BANDWIDTH UES INITIAL ACCESS

(71) Applicant: Telefonaktiebolaget LM Ericsson (publ), Stockholm (SE)

(72) Inventors: Mohammad Mozaffari, Fremont, CA (US); Yutao Sui, Solna (SE); Yi-Pin Eric Wang, Fremont, CA (US); Johan Bergman, Stockholm (SE); Anders Wallén, Ystad (SE); Andreas Höglund, Solna (SE); Kittipong Kittichokechai, Järfälla (SE); Riikka Susitaival, Helsinki (FI); Yi-Ju Chen, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 451 days.

(21) Appl. No.: 17/914,798

(22) PCT Filed: Mar. 29, 2021

(86) PCT No.: PCT/SE2021/050279
§ 371 (c)(1),
(2) Date: Sep. 27, 2022

(87) PCT Pub. No.: WO2021/201757
PCT Pub. Date: Oct. 7, 2021

(65) Prior Publication Data
US 2023/0299924 A1 Sep. 21, 2023

Related U.S. Application Data

(60) Provisional application No. 63/003,003, filed on Mar. 31, 2020.

(51) Int. Cl.
*H04L 5/00* (2006.01)
*H04W 72/232* (2023.01)

(52) U.S. Cl.
CPC ......... *H04L 5/0053* (2013.01); *H04W 72/232* (2023.01)

(58) Field of Classification Search
CPC ........................... H04L 5/0064; H04L 5/0053
See application file for complete search history.

(56) References Cited

U.S. PATENT DOCUMENTS

| 10,951,359 | B2 * | 3/2021 | Huang | H04W 72/23 |
|---|---|---|---|---|
| 2019/0281588 | A1 * | 9/2019 | Zhang | H04W 52/08 |

(Continued)

FOREIGN PATENT DOCUMENTS

| WO | 2018199685 A1 | 11/2018 |
|---|---|---|
| WO | 2021201756 A1 | 10/2021 |

OTHER PUBLICATIONS

3GPP TSG RAN WG1 Meeting#92, R1-1802684 Title:Correctionof DMRS sequence initialization for PDCCH (Year: 2018).*
Author Unknown, "Technical Specification Group Radio Access Network; NR; Physical channels and modulation (Release 16)," Technical Specification 38.211, Version 16.0.0, Dec. 2019, 3GPP Organizational Partners, 129 pages.

(Continued)

*Primary Examiner* — Faruk Hamza
*Assistant Examiner* — Abusayeed M Haque
(74) *Attorney, Agent, or Firm* — Withrow & Terranova, PLLC

(57) ABSTRACT

Systems and methods are disclosed herein for Control Resource Set (CORESET) enhancements for initial access. In one embodiment, a method performed by a wireless communication device comprises receiving and decoding a Physical Downlink Control Channel (PDCCH) transmission in a CORESET in accordance with at least a portion of a Control Channel Element (CCE) to Resource Element Group (REG) mapping. The PDCCH transmission comprises one or more CCEs. The CCE to REG mapping comprises an interleaved portion that maps the one or more CCEs to a first set of REGs that are spread across a bandwidth of the CORESET, and a second portion that maps (Continued)

at least a portion of an additional CCE to at least a REG in a frequency gap between two REGs in the first set of REGs, the additional CCE corresponding to one of the CCEs mapped to the first set of REGs.

19 Claims, 13 Drawing Sheets

(56) References Cited

U.S. PATENT DOCUMENTS

| | | | | |
|---|---|---|---|---|
| 2019/0356524 | A1* | 11/2019 | Yi | H04B 7/0617 |
| 2020/0045569 | A1* | 2/2020 | Seo | H04W 72/23 |
| 2020/0059916 | A1* | 2/2020 | Sun | H04W 72/0453 |
| 2020/0367242 | A1 | 11/2020 | Moon et al. | |

OTHER PUBLICATIONS

Author Unknown, "Technical Specification Group Radio Access Network; NR; Physical layer procedures for control (Release 16)," Technical Specification 38.213, Version 16.0.0, Dec. 2019, 3GPP Organizational Partners, 146 pages.

Ericsson, "RP-193238: New SID on support of reduced capability NR devices," 3GPP TSG RAN Meeting #86, Dec. 9-12, 2019, Sitges, Spain, 5 pages.

ZTE, "R1-1707158: Resource mapping and Interleaving of PDCCH," 3GPP TSG RAN WG1 Meeting #89, May 15-19, 2017, Hangzhou, China, 6 pages.

International Search Report and Written Opinion for International Patent Application No. PCT/SE2021/050279, mailed Jun. 11, 2021, 10 pages.

* cited by examiner

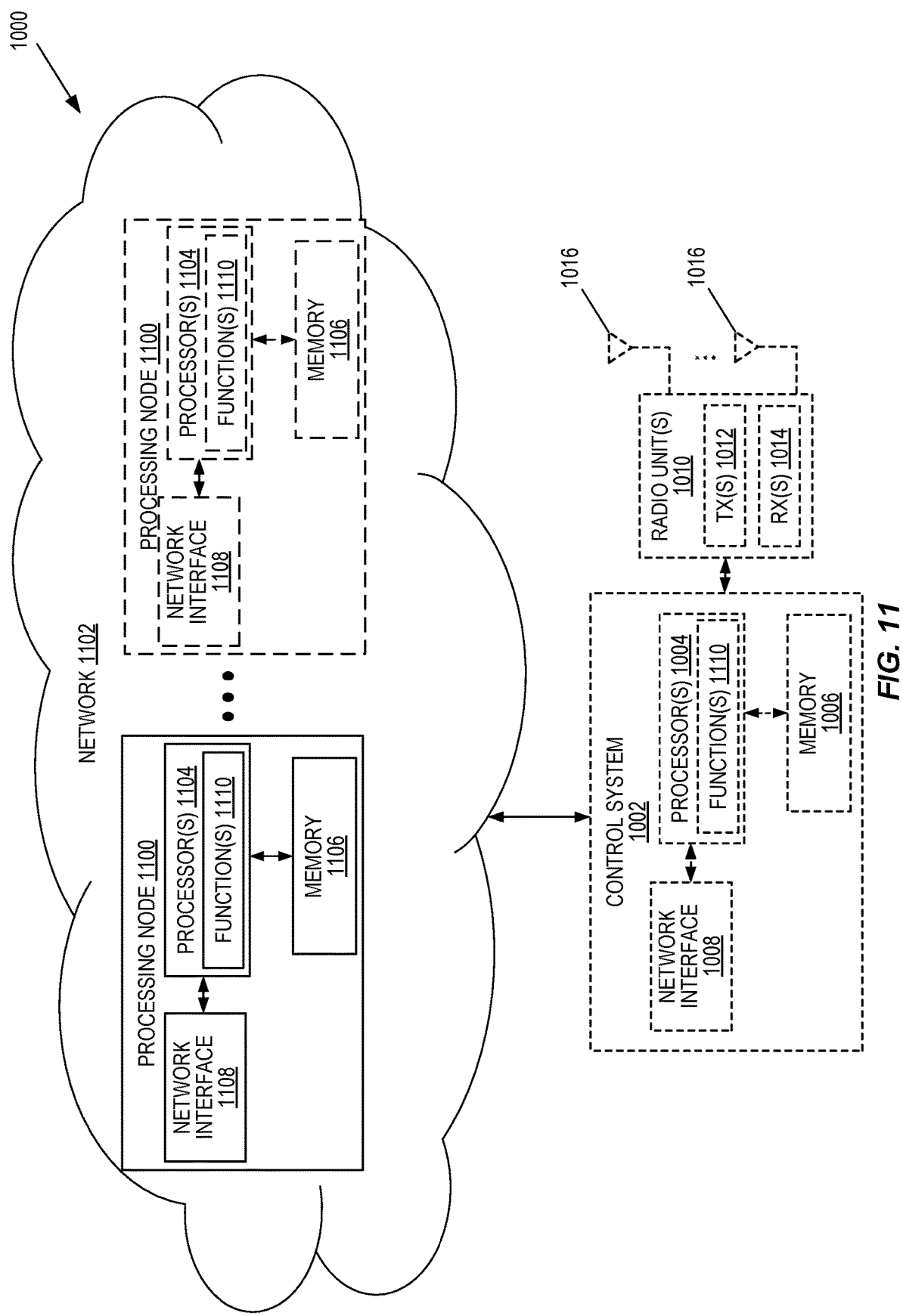

CORESET ENHANCEMENT FOR REDUCED BANDWIDTH UES INITIAL ACCESS

RELATED APPLICATIONS

This application is a 35 U.S.C. § 371 national phase filing of International Application No. PCT/SE2021/050279, filed Mar. 29, 2021, which claims the benefit of provisional patent application Ser. No. 63/003,003, filed Mar. 31, 2020, the disclosures of which are hereby incorporated herein by reference in their entireties.

TECHNICAL FIELD

The present disclosure relates to a cellular communications system and, more specifically, to a Control Resource Set (CORESET) utilized in a cellular communications system.

BACKGROUND

For time critical Machine Type Communication (cMTC) support, Ultra-Reliable Low-Latency Communication (URLLC) was introduced in Third Generation Partnership Project (3GPP) Release 15 for both Long Term Evolution (LTE) and New Radio (NR). NR URLLC is further enhanced in Release 16 within the enhanced URLLC (eU-RLLC) and Industrial Internet of Things (IoT) work items.

For massive Machine Type Communication (mMTC) and Low Power Wide Area (LPWA) support, 3GPP introduced both narrowband Internet-of-Things (NB-IoT) and LTE for Machine-Type Communication (LTE-MTC, or LTE-M) in Release 13. These technologies have been further enhanced through all releases up until and including the ongoing Release 16 work.

NR was introduced in 3GPP Release 15 and focused mainly on the enhanced Mobile Broadband (eMBB) and cMTC. For Release 17, however, an NR User Equipment (UE) type with lower capabilities will likely be introduced since it is supported and proposed by many companies. The intention is to have a Machine Type Communication (MTC) version of NR, i.e. Reduced Capability NR (NR-RedCap) device (also referred to herein as an NR-RedCap UE), which is mid-end, filling the gap between eMBB NR and NB-IoT/LTE-M, e.g., to provide more efficient in-band operation with URLLC in industrial use cases.

Low-cost or low-complexity UE implementation is needed for the Fifth Generation (5G) system, e.g., for massive industrial sensors deployment or wearables. Currently, NR-RedCap device is used as the running name for the discussion of such low-complexity UEs in 3GPP (see RP-193238 for more detail). NR-RedCap is a new feature that is currently under discussion and could be introduced as early as in 3GPP Release 17. A NR-RedCap device is intended for use cases that do not require a device to support full-fledged NR capability and IMT-2020 performance requirements. For example, the data rate does not need to reach above 1 Gigabits per second (Gbps), and the latency does not need to be as low as 1 millisecond (ms). By relaxing the data rate and latency targets, NR-RedCap allows low-cost or low-complexity UE implementation. In 3GPP Release 15, an NR UE is required to support 100 Megahertz (MHz) carrier bandwidth in frequency range 1 (from 410 MHz to 7125 MHz) and 200 MHz carrier bandwidth in frequency range 2 (from 24.25 GHz to 52.6 GHz). For NR-RedCap UEs, supporting 100 MHz or 200 MHz bandwidth is superfluous. For example, a UE bandwidth of 8.64 MHz might be sufficient if the use cases do not require a data rate higher than 20 Megabits per second (Mbps). Reduced UE bandwidth results in complexity reduction and possibly energy consumption reduction as well.

NR CORESET and PDCCH

Physical Downlink Control Channel (PDCCH) carries Downlink Control Information (DCI). PDCCHs are transmitted in Control Resource Sets (CORESETs) which span over one, two, or three contiguous Orthogonal Frequency Division Multiplexing (OFDM) symbols over multiple Resource Blocks (RBs). In frequency domain, a CORESET can span over one or multiple chunks of six RBs. For CORESETs other than CORESET #0, these multiple chunks of six RBs can be either contiguous or non-contiguous, and CORESETs are aligned with a six-RB grid (starting from reference Point A). CORESET #0, which is configured during the initial access, can only have 24, 48, or 96 RBs. Also, CORESET #0 must be contiguous in frequency domain, and it is not necessarily aligned with the six-RB grid.

A PDCCH is carried by 1, 2, 4, 8, or 16 Control Channel Elements (CCEs). Multiple CCEs used for transmission of a DCI are referred to as an Aggregation Level (AL). Each CCE is composed of six Resource Element Groups (REGs), and each REG is twelve Resource Elements (REs) in one OFDM symbol, as shown in FIG. 1. A REG bundle consists of 2, 3, or 6 REGs. Thus, a CCE can be composed of one or multiple REG bundles. FIG. 1 illustrates an example of a CORESET (36 RBs and one symbol).

Each CORESET is associated with a CCE-REG mapping which can be interleaved or non-interleaved. In the non-interleaved case, all CCEs in an AL are mapped in consecutive REG bundles of the associated CORESET. In the interleaved case, REG bundles of CCEs are distributed on the frequency domain over the entire CORESET BW. For CORESET #0, the CCE-REG mapping is always interleaved with predefined parameters (see 3GPP Technical Specification (TS) 38.211, "NR; Physical channels and modulation").

In order to receive DCI, a UE needs to blindly decode PDCCH candidates potentially transmitted from the network using one or more search spaces. A search space consists of a set of PDCCH candidates where each candidate can occupy multiple CCEs. The number of CCEs used for a PDCCH candidate is referred to as AL which in NR can be 1, 2, 4, 8, or 16. A higher AL provides higher coverage.

SUMMARY

Systems and methods are disclosed herein for Control Resource Set (CORESET) enhancements for initial access that are particularly beneficial for reduced bandwidth wireless communication devices. Embodiments of a method performed by a wireless communication device are disclosed. In one embodiment, a method performed by a wireless communication device comprises receiving and decoding a Physical Downlink Control Channel (PDCCH) transmission in a CORESET in accordance with at least a portion of a Control Channel Element (CCE) to Resource Element Group (REG) mapping. The PDCCH transmission comprises one or more CCEs. The CCE to REG mapping comprises an interleaved portion that maps the one or more CCEs to a first set of REGs that are spread across a bandwidth of the CORESET, and a second portion that maps at least a portion of an additional CCE to at least a REG in a frequency gap between two REGs in the first set of REGs, the additional CCE corresponding to one of the one or more CCEs mapped to the first set of REGs by the interleaved portion of the CCE to REG mapping. In this manner, the CORESET is enhanced in a manner that is particularly beneficial for reduced bandwidth wireless communication devices.

Corresponding embodiments of a wireless communication device are also disclosed. In one embodiment, a wireless communication device is adapted to receive and decode a PDCCH transmission in a CORESET in accordance with at least a portion of a CCE to REG mapping. The PDCCH transmission comprises one or more CCEs. The CCE to REG mapping comprises an interleaved portion that maps the one or more CCEs to a first set of REGs that are spread across a bandwidth of the CORESET, and a second portion that maps at least a portion of an additional CCE to at least a REG in a frequency gap between two REGs in the first set of REGs, the additional CCE corresponding to one of the one or more CCEs mapped to the first set of REGs by the interleaved portion of the CCE to REG mapping.

In one embodiment, a wireless communication device comprises one or more transmitters, one or more receivers, and processing circuitry associated with the one or more transmitters and the one or more receivers. The processing circuitry is configured to cause the wireless communication device to receive and decode a PDCCH transmission in a CORESET in accordance with at least a portion of a CCE to REG mapping. The PDCCH transmission comprises one or more CCEs. The CCE to REG mapping comprises an interleaved portion that maps the one or more CCEs to a first set of REGs that are spread across a bandwidth of the CORESET, and a second portion that maps at least a portion of an additional CCE to at least a REG in a frequency gap between two REGs in the first set of REGs, the additional CCE corresponding to one of the one or more CCEs mapped to the first set of REGs by the interleaved portion of the CCE to REG mapping.

Embodiments of a method performed by a network node are also disclosed. In one embodiment, a method performed by a network node comprises transmitting a PDCCH transmission in a CORESET in accordance with a CCE to REG mapping. The PDCCH transmission comprises one or more CCEs. The CCE to REG mapping comprises an interleaved portion that maps the one or more CCEs to a first set of REGs that are spread across a bandwidth of the CORESET and a second portion that maps at least a portion of an additional CCE to at least a REG in a frequency gap between two REGs in the first set of REGs, the additional CCE corresponding to one of the one or more CCEs mapped to the first set of REGs by the interleaved portion of the CCE to REG mapping.

Corresponding embodiments of a network node are also disclosed. In one embodiment, a network node is adapted to transmit a PDCCH transmission in a CORESET in accordance with a CCE to REG mapping. The PDCCH transmission comprises one or more CCEs. The CCE to REG mapping comprises an interleaved portion that maps the one or more CCEs to a first set of REGs that are spread across a bandwidth of the CORESET and a second portion that maps at least a portion of an additional CCE to at least a REG in a frequency gap between two REGs in the first set of REGs, the additional CCE corresponding to one of the one or more CCEs mapped to the first set of REGs by the interleaved portion of the CCE to REG mapping.

Corresponding embodiments of a network node are also disclosed. In one embodiment, a network node comprises processing circuitry configured to cause the network node to transmit a PDCCH transmission in a CORESET in accordance with a CCE to REG mapping. The PDCCH transmission comprises one or more CCEs. The CCE to REG mapping comprises an interleaved portion that maps the one or more CCEs to a first set of REGs that are spread across a bandwidth of the CORESET and a second portion that maps at least a portion of an additional CCE to at least a REG in a frequency gap between two REGs in the first set of REGs, the additional CCE corresponding to one of the one or more CCEs mapped to the first set of REGs by the interleaved portion of the CCE to REG mapping.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 10 through 12 are schematic block diagrams of example embodiments of a network node;

DETAILED DESCRIPTION

Figure 1:
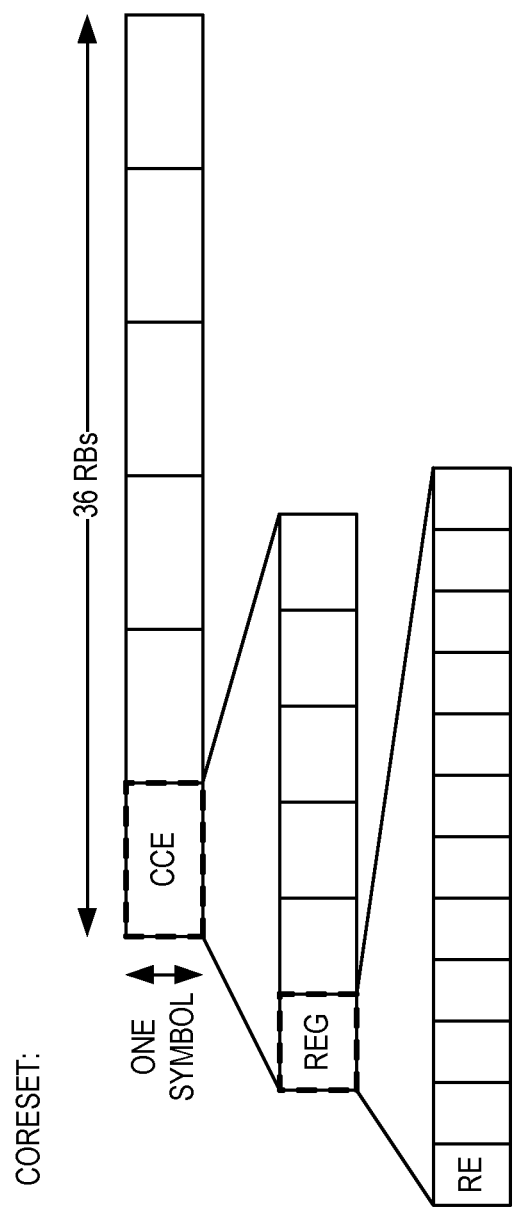
FIG. 1 illustrates an example of a Control Resource Set (CORESET)

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Reduced Bandwidth Wireless Communication Device: As used herein, a "reduced bandwidth wireless communication device" or a "reduced bandwidth UE" is a wireless communication device or UE that does not support the full system bandwidth of a cellular communications system, or more specifically does not support the full system bandwidth of particular cell of the cellular communications system for which the wireless communication device or UE desires to perform initial access and/or acquire system information (e.g., MIB) and/or monitor for paging and control channel. For example, a reduced bandwidth wireless communication device may be a wireless communication device that supports a bandwidth of 10 MHz, 15 MHz, 20 MHz, etc., which is less than a fully system bandwidth of a carrier (e.g., a NR carrier) which may be, e.g., 100 MHz.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s). In NR, Control Resource Set (CORESET) #0 can be configured only with interleaved Control Channel Element (CCE) to Resource Element Group (REG) mapping (referred to herein as "CCE-REG mapping"). Consequently, CCEs for a Physical Downlink Control Channel (PDCCH) candidate may map to REGs spread (non-contiguously) over the entire CORESET bandwidth. In this case, although the bandwidth of a PDCCH candidate is less than the CORESET bandwidth, the UE needs to monitor the entire CORESET bandwidth to receive the PDCCH candidate. In fact, for Aggregation Level (AL) greater than 1, the UE needs to configure the entire CORESET bandwidth. Configuring the entire CORESET #0 bandwidth, although advantageous in terms of coverage and scheduling capacity, creates a problem for a low-complexity UE that only supports smaller UE bandwidths than the bandwidth required for CORESET #0. If the option of non-interleaved CCE-REG mapping is enabled, reduced bandwidth UEs can receive PDCCH candidates by monitoring a portion of CORESET #0.

Another issue is that reduced bandwidth UEs may not be able to be configured with high ALs (e.g., 8 or 16) which leads to PDCCH coverage degradation. For example, if the UE supports up to 10 Megahertz (MHz) bandwidth, it cannot be configured with AL 16 in the 30 kilohertz (kHz) subcarrier spacing (SCS) case by using the currently supported configurations. In the current design, CORESET duration can be at most three symbols which is a limiting factor in supporting high ALs for reduced bandwidth UEs.

Certain aspects of the present disclosure and their embodiments may provide solutions to the aforementioned or other challenges. Embodiments of the proposed solutions provide a CORESET configuration that is suitable for reduced bandwidth UEs for use for initial access; however, the embodiments disclosed herein are not limited to use for reduced bandwidth UEs or initial access. In particular, in one embodiment, a non-interleaved CCE-REG mapping is introduced for CORESET #0 for initial access. By introducing a non-interleaved CCE-REG mapping for CORESET #0 for initial access, the UE does not need to receive the entire current CORESET #0 bandwidth for the legacy NR UEs. In one embodiment, CORESET expansion in the time domain is also provided. By introducing CORESET expansion in the time domain, the reduced bandwidth UEs can configure high PDCCH ALs to achieve coverage and capacity improvement.

Embodiments of the proposed solutions propose CORESET enhancement techniques that are applicable to all UEs, but are particularly beneficial for reduced bandwidth UEs. First, by supporting non-interleaved CCE-REG mapping for CORESET #0 in some embodiments, reduced bandwidth UEs will be able to configure a portion of the CORESET bandwidth to receive PDCCH candidates. Second, by introducing the possibility of CORESET expansion in time domain in some embodiments, high PDCCH ALs can be supported for reduced bandwidth UEs which leads to coverage and capacity enhancement.

Certain embodiments may provide one or more of the following technical advantage(s). Embodiments of the proposed solutions enable reduced bandwidth UEs to efficiently receive PDCCH for initial access. In particular, for CORESET #0, the UE can configure a portion of the CORESET bandwidth to receive PDCCH candidates. Furthermore, the proposed time domain CORESET expansion allows the reduced bandwidth UEs to configure high PDCCH ALs to achieve high coverage and capacity.

Figure 2:
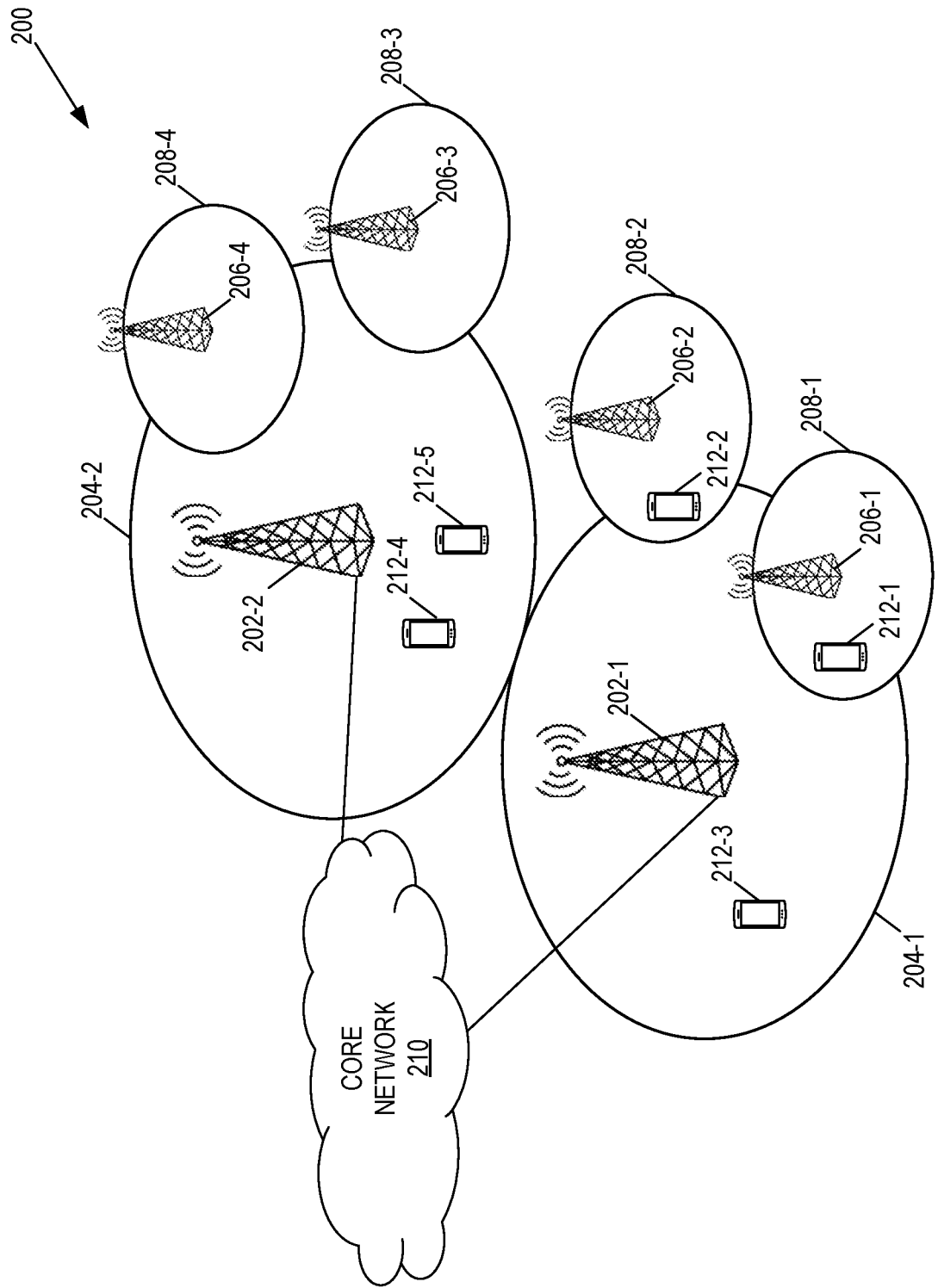
FIG. 2 illustrates one example of a cellular communications system in which embodiments of the present disclosure may be implemented.

FIG. 2 illustrates one example of a cellular communications system 200 in which embodiments of the present disclosure may be implemented. In the embodiments described herein, the cellular communications system 200 is a 5G System (5GS) including a Next Generation Radio Access Network (NG-RAN); however, the embodiments disclosed herein are not limited thereto. In this example, the RAN includes base stations 202-1 and 202-2, which in the NG-RAN include NR base stations (gNBs) and optionally ng-eNBs (i.e., LTE RAN nodes connected to 5G Core (5GC)), controlling corresponding (macro) cells 204-1 and 204-2. The base stations 202-1 and 202-2 are generally referred to herein collectively as base stations 202 and individually as base station 202. Likewise, the (macro) cells 204-1 and 204-2 are generally referred to herein collectively as (macro) cells 204 and individually as (macro) cell 204. The RAN may also include a number of low power nodes 206-1 through 206-4 controlling corresponding small cells 208-1 through 208-4. The low power nodes 206-1 through 206-4 can be small base stations (such as pico or femto base stations) or Remote Radio Heads (RRHs), or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208. The cellular communications system 200 also includes a core network 210, which in the 5GS is referred to as the 5G Core (5GC). The base stations 202 (and optionally the low power nodes 206) are connected to the core network 210.

The base stations 202 and the low power nodes 206 provide service to wireless communication devices 212-1 through 212-5 in the corresponding cells 204 and 208. The wireless communication devices 212-1 through 212-5 are generally referred to herein collectively as wireless communication devices 212 and individually as wireless communication device 212. In the following description, the wireless communication devices 212 are oftentimes UEs and as such oftentimes referred to as UEs 212, but the present disclosure is not limited thereto. Further, at least some of the wireless communication devices 212 are reduced bandwidth wireless communication devices, which are referred to below as reduced bandwidth UEs 212.

Now, a description some example embodiments of the present disclosure will be provided. Note that while these example embodiments are described in relation to a reduced bandwidth UE 212, the embodiments described herein are not limited thereto. For example, the embodiments described herein may be used even for UEs 212 that support the full bandwidth of the CORESET where the additional CCE(s) or additional portion(s) of a CCE(s) may be used to improve decoding and/or coverage at the UE 212. Further, the embodiments described below are described in relation to CORESET #0 for initial access; however, the embodiments described herein are not limited to CORESET #0 and, therefore, can additionally or alternatively be used for other CORESETs.

Currently, the NR system design mostly targets broadband services and assumes that all NR UEs can support large bandwidths, e.g., 100 MHz in Frequency Range 1 (FR1). Therefore, the supported CORESETs can be configured to use almost all of the system bandwidth in the frequency domain and up to three OFDM symbols in the time domain. In a NR system with a large bandwidth, it is not a problem to support up to sixteen ALs and at the same time maintain the PDCCH capacity in a cell.

However, for NR-RedCap UEs which are expected to have much smaller bandwidth, as discussed above, both coverage problems due to not supporting high enough AL levels and capacity problems due to limited bandwidth may be encountered. These problems can be more prominent when the NR-RedCap UEs may not be able to perform as many blind decodings as NR UEs due to reduced complexity, meaning less PDCCH candidates are checked by the UEs to identify a Downlink Control Information (DCI).

One of the initial access steps is for the UE to acquire System Information Block type 1 (SIB1) (SIB1 is acquired after the UE acquires the Master Information Block (MIB)), which is scheduled through PDCCH using Search Space #0 associated with CORESET #0. In NR, CORESET #0 has a bandwidth of 4.32 MHz, 8.64 MHz, or 17.28 MHz in FR1, and 34.56 MHz or 69.12 MHz in FR2. The bandwidth of CORESET #0 depends on the subcarrier spacing indicated in MIB (by parameter subCarrierSpacingCommon)and is configured by the network. If CORESET #0 uses 30 kHz subcarrier spacing for PDCCH, the bandwidth of CORESET #0 can be either 8.64 MHz or 17.28 MHz. The network may choose either bandwidth option. Between the two options, some implementation considerations may favor the configuration of 17.28 MHz bandwidth for CORESET #0. For example, with 30 kHz subcarrier spacing and 17.28 MHz CORESET #0 bandwidth, PDCCH can operate with AL 16, which offers the highest PDCCH coverage. In comparison, configuring CORESET #0 with bandwidth 8.64 MHz can only support AL 8 when PDCCH is configured with 30 kHz subcarrier spacing, which results in approximately 3 decibel (dB) coverage reduction compared to AL 16. Furthermore, using a higher CORESET #0 bandwidth gives rise to higher scheduling capacity. Using 17.28 MHz bandwidth, however, may result in CORESET #0 not being useable by low-complexity UEs, e.g., NR-RedCap UEs, that only support smaller UE bandwidths, especially considering that currently only an interleaved mapping is supported by CORESET #0, which means a PDCCH candidate may span the entire bandwidth of CORESET #0.

Figure 3:
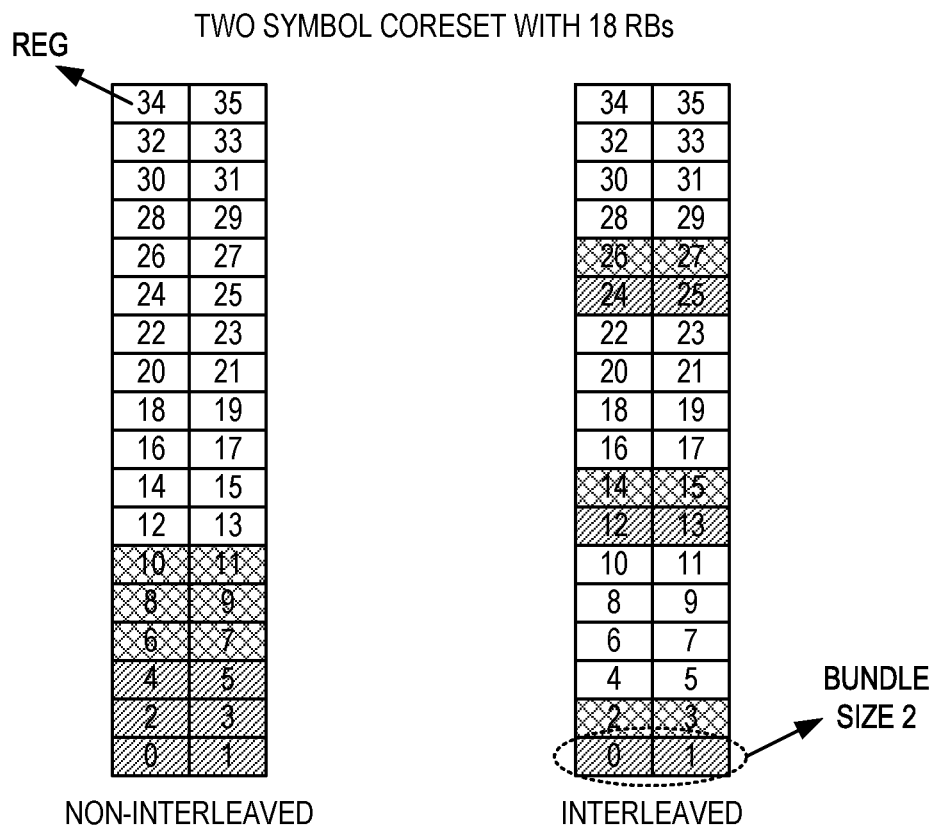
FIG. 3 illustrates examples of interleaved and non-interleaved Control Channel Element (CCE) to Resource Element Group (REG) mappings.

One solution to solve the problem as proposed herein is to expand the CORESET in time domain, i.e., to include more than three OFDM symbols in the time domain. One associated challenge to this problem is that it may not be easy to support the current CCE mappings within a CORESET. Currently, a UE can be configured with multiple CORESETs. Each CORESET is associated with one CCE-to-REG mapping only. Both interleaved and non-interleaved mappings can be used. For non-interleaved mapping, all CCEs for a DCI with AL L are mapped in consecutive REG bundles of the associated CORESET. For interleaved mapping, each CCE is split in frequency domain to provide diversity. Using AL 2 as an example, FIG. 3 illustrates the interleaved and non-interleaved cases.

From the interleaved case, the REG bundle size also has an impact on the mapping, where within a REG bundle the UE can assume the same precoding is used. In the frequency domain, other than CORESET #0, a bit map is used to indicate the resource allocation for the CORESETs. Each bit corresponds to a group of 6 RBs, with grouping starting from the first RB group (see, e.g., 3GPP TS 38.213, clause 10.1) in the bandwidth part (BWP). The first (left-most/most significant) bit corresponds to the first RB group in the BWP, and so on. A bit that is set to 1 indicates that this RB group belongs to the frequency domain resource of this CORESET. Bits corresponding to a group of RBs not fully contained in the bandwidth part within which the CORESET is configured are set to zero (see, e.g., 3GPP TS 38.211, clause 7.3.2.2).

Embodiments of several solutions are described below for designing CORESET #0 and CCE-REG mappings to minimize design changes based on the current NR design. However, it is important to note that while the description herein focuses on 3GPP NR, the solutions described herein are not limited thereto. In NR, CORESET #0 is used by UEs to acquire system information or to receive paging message. However, due to the limited MIB size, the current configuration of CORESET #0 is not as flexible as other CORESETs. Therefore, in order to have good coexistence between NR REDCAP UEs and legacy NR UEs, the CORESET used for NR REDCAP UE for initial access needs to be re-designed.

Notice, in the following description, CORESET #0 is used as a name and should not be seen as a restriction. The solutions described herein apply to any CORESET that a reduced bandwidth UE (e.g., a NR RECAP UE) uses for performing initial access to the system and/or for acquiring system information and/or monitoring paging.

Figure 4:
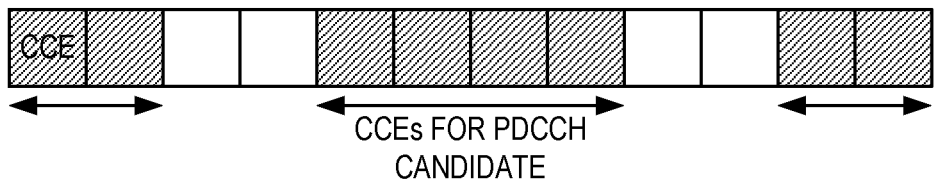
FIG. 4 shows locations of CCEs for Physical Downlink Control Channel (PDCCH) Aggregation Level (AL) 8, in a three-symbol interleaved CORESET with 24 Resource Blocks (RBs)

Embodiments of the solutions disclosed herein enable non-interleaved CCE-REG mapping for CORESET #0 or for a CORESET used by reduced bandwidth UEs (e.g., NR RECAP UEs) for initial access and/or for acquiring system information and/or for monitoring paging. In this regard, as discussed earlier, the current NR CORESET #0 only supports interleaved CCE-REG mapping. Therefore, CCEs carrying PDCCH candidates are spread over the entire CORESET bandwidth. In fact, for any AL greater than one (e.g., ALs in the set {2, 4, 8, 16}), the UE needs to configure the entire CORESET bandwidth to receive a PDCCH candidate when using the existing CORESET #0 design. As an example, FIG. 4 shows the locations of CCEs for PDCCH AL 8, in a three-symbol interleaved CORESET with 24 RBs. Notice the example illustrated in FIG. 4 assumes a specific cell identity (ID), e.g., $N_{cell}^{ID}$=4, 16, 28. This should not be a limitation. All of the cases are not exhaustively shown herein; however, the solutions described herein apply to any cell ID.

Figure 5:
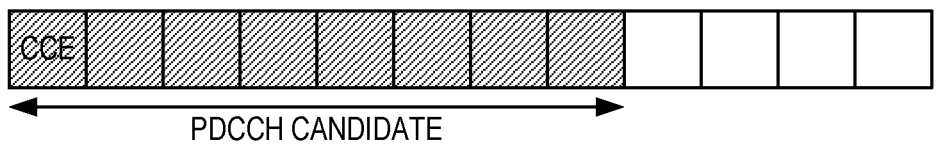
FIG. 5 illustrates an example of CCEs for a PDCCH candidate with AL 8 in a non-interleaved CO RESET.

An NR-RedCap UE may not support the wide bandwidth used by the existing CORESET #0 interleaved design and, as such, may not be able to receive CORESET #0, especially if it is expected that the same CORESET #0 is used by both legacy NR UEs and NR-RedCap UEs. In this case, in accordance with embodiments of the present disclosure, non-interleaved CCE-REG mapping is enabled for NR-RedCap UEs, while interleaved mapping is maintained for legacy NR UEs. By enabling non-interleaved CCE-REG mapping for NR-RedCap UEs, a PDCCH candidate spans over a contiguous set of CCEs, as shown in FIG. 5. In particular, FIG. 5 illustrates an example of CCEs for a PDCCH candidate with AL 8 in a non-interleaved CORESET.

Figure 6:
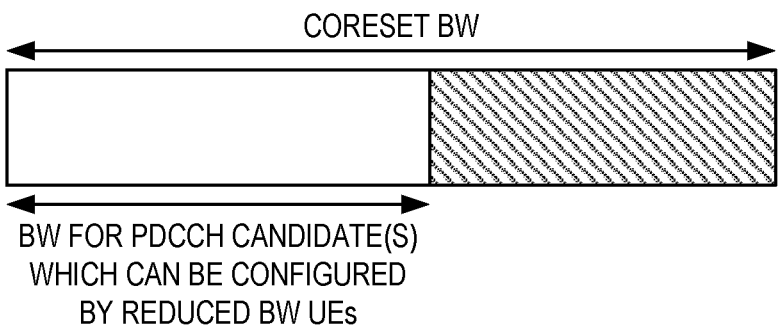
FIG. 6 illustrates an example of in which a User Equipment (UE) can receive PDCCH by configuring a portion of the CORESET bandwidth.

With such a non-interleaved mapping option, the reduced bandwidth UE (e.g., NR RedCap UE) will not require the full CORESET bandwidth. Instead, the UE can receive PDCCH by configuring a portion of the CORESET bandwidth, as illustrated in FIG. 6. As a representative result, in Table 1, a comparison of the required bandwidth for receiving a PDCCH candidate for interleaved and non-interleaved mappings is provided.

TABLE 1

Minimum BW for receiving a PDCCH candidate.

| CORESET (30 kHz SCS) | Maximum AL | BW (interleaved) | BW (non-interleaved) |
| --- | --- | --- | --- |
| 24 PRBs, 3-symbol | 8 | 8.64 MHz | 5.76 MHz |
| 48 PRBs, 3-symbol | 16 | 17.28 MHz | 11.52 MHz |

Figure 7:
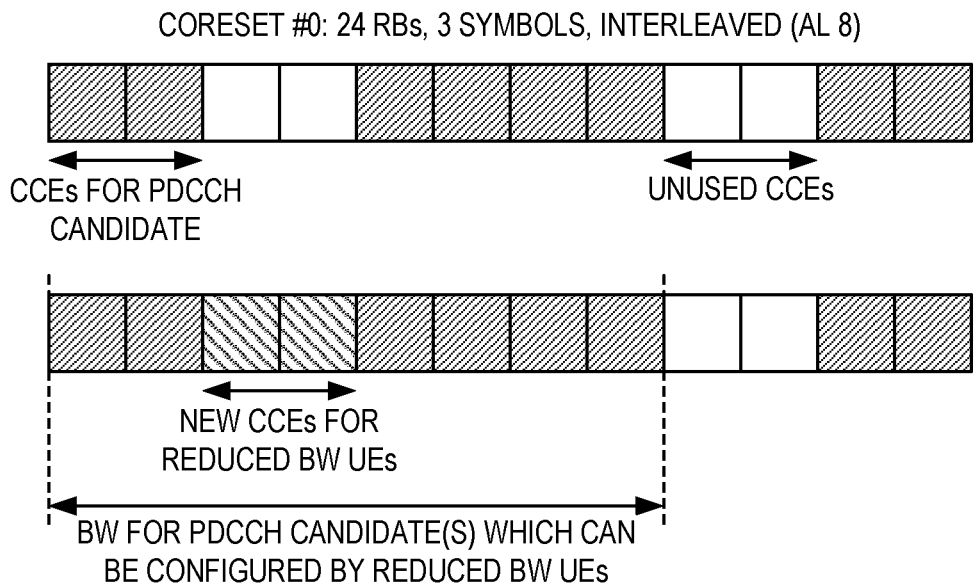
FIG. 7 illustrates one example of adding new CCEs for reduced bandwidth UEs within CORESET #0 in accordance with one embodiment of the present disclosure.

In order to support such configuration, in some embodiments, additional CCEs are transmitted only for reduced bandwidth UEs (e.g., NR-RedCap UEs) within the portion of the CORESET bandwidth that can be configured for the reduced bandwidth UEs. These additional CCEs are used to create a contiguous set of CCEs for transmitting PDCCH within the portion of the CORESET bandwidth that can be configured for the reduced bandwidth UEs. This, in turn, will enable a reduced bandwidth UE to receive PDCCH within its supported bandwidth. An example of adding new CCEs for reduced bandwidth UEs within CORESET #0 is illustrated in FIG. 7.

Figure 8:
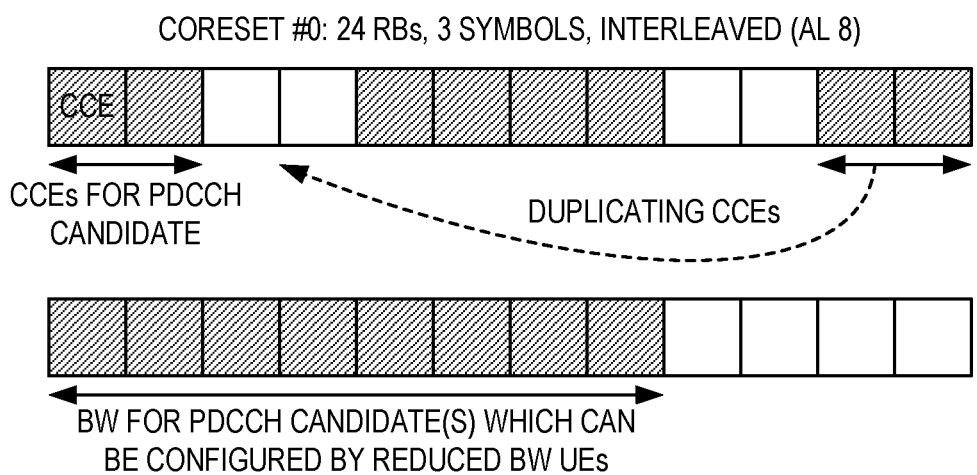
FIG. 8 illustrates an example of remapping the CCEs that fall outside the bandwidth of the reduced bandwidth UE such that they are interleaved with the CCEs that are within a configured bandwidth of the reduced bandwidth UE such that the resulting CCEs within the configured bandwidth of the reduced bandwidth UE are contiguous, in accordance with one embodiment of the present disclosure.

In one embodiment, the CCEs that are outside the bandwidth of the reduced bandwidth UE can be remapped back to the supported bandwidth of the reduced bandwidth UEs. The remapping of the CCEs can be consecutive, i.e., the CCEs are remapped in their original order (e.g., if original order when interleaved across the full CORESET #0 bandwidth is CCE #1, CCE #2, CCE #3, etc., then this same order is maintained when the CCEs are remapped to the bandwidth configured for the reduced bandwidth UE), or the CCEs can be interleaved, i.e., the CCEs that are outside the bandwidth of the reduced bandwidth UE are copied to available resource gaps between the CCEs that are inside the bandwidth configured for the reduced bandwidth UE. An example of remapping the CCEs that fall outside the bandwidth of the reduced bandwidth UE such that they are interleaved with the CCEs that are within configured bandwidth of the reduced bandwidth UE such that the resulting CCEs within the configured bandwidth of the reduced bandwidth UE are contiguous is illustrated in FIG. 8.

Thus, the additional CCEs added within the bandwidth configured for the reduced bandwidth UE can be the same as the interleaved ones that are outside the UE supported bandwidth (i.e., the legacy NR CCEs which cannot be received by the NR-RedCap UEs). In this way, the reduced bandwidth UE (e.g., a NR-RedCap UE) can receive PDCCH while sharing the CORESET #0 with legacy NR UEs that support interleaved CCE-REG mapping.

Furthermore, the CORESET #0 for the reduced bandwidth UE can be expanded in time domain. This can be indicated by the network, e.g., in the MIB which the reduced bandwidth UE monitors or by a separate indicative signal, i.e., the reduced bandwidth UE can notice whether there are some extra symbols configured for its CORESET #0. If this indication is available, the extra symbol in the time domain can be used to carry the missed CCEs. For example, the missing CCEs that are outside the supported bandwidth of the reduced bandwidth UE are re-mapped to the extra symbol(s) in the time domain. The extra symbol(s) may be allowed or configured with a different mapping of CCEs to provided benefits, e.g., frequency diversity and/or interference randomization.

In one embodiment, the re-mapping of the CCEs that fall outside the supported bandwidth of the reduced bandwidth UE to resources within the configured bandwidth of the reduced bandwidth UE is conditional on a bandwidth of the supported bandwidth of the UE. For example, if the bandwidth of the configured CORESET #0 is larger than supported bandwidth of the reduced bandwidth UE, then it is implicitly understood that CCE re-mapping is used for CORESET #0 for the reduced bandwidth UE.

This is further complicated if there are several possible reduced bandwidth sizes. In this case, one solution is that for CSS (SIB1 and RA Msg2, etc.) re-mapping corresponding to the most narrow bandwidth (e.g., of any reduced bandwidth UE that is supported by the cellular communications system or supported by the corresponding base station or cell) is applied by base station (e.g., gNB), and the UE, depending on its bandwidth, either decodes PDCCH as a reduced bandwidth device with the most narrow possible bandwidth or as a legacy UE if the bandwidth supported by the UE is equal to or greater than the entire bandwidth configured for CORESET #0.

In one embodiment, the re-mapping of the CCEs that fall outside the supported bandwidth of the reduced bandwidth UE to resources within the configured bandwidth of the reduced bandwidth UE is conditional on the cell ID, e.g., PCID or other information that fully or partially identifies the cell. This provides benefits of interference randomization among neighboring cells.

In another embodiment, the re-mapping of the CCEs that fall outside the supported bandwidth of the reduced bandwidth UE to resources within the configured bandwidth of the reduced bandwidth UE is conditional on the aggregation levels. This is especially important if extra symbols are used for the CORESET #0 used by the reduced bandwidth UE.

Figure 9:
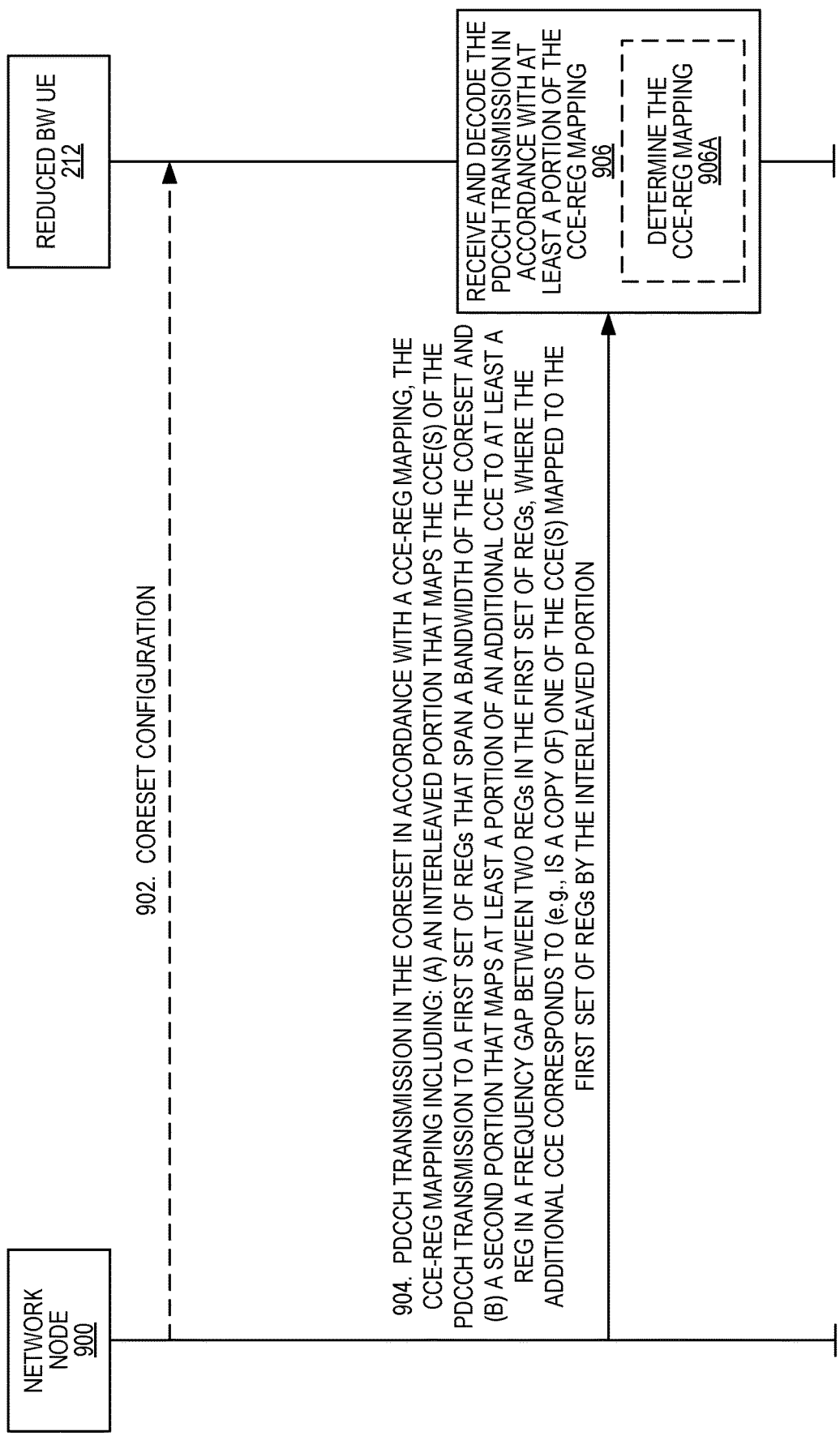
FIG. 9 illustrates the operation of a network node (e.g., a base station such as, e.g., a gNB, or a network node that implements at least some of the functionality of the base station) and a reduced bandwidth UE in accordance with at least some embodiments of the present disclosure.

FIG. 9 illustrates the operation of a network node 900 (e.g., a base station 202 such as, e.g., a gNB, or a network node that implements at least some of the functionality of the base station 202) and a reduced bandwidth UE 212 in accordance with at least some embodiments of the solutions described above. Optional steps are represented by dashed lines/boxes. Again, note that while the reduced bandwidth UE 212 is used for this example, the present disclosure is not limited thereto. As illustrated, the network node 900 optionally sends information to the reduced bandwidth UE 212 that configures a CORESET (step 902). In other words, the network node 900 sends a CORESET configuration to the reduced bandwidth UE 212. This may be done via broadcast information such as, e.g., MIB. In one embodiment, the CORESET configuration is a configuration of a bandwidth of the CORESET. Further, in one embodiment, the CORESET is CORESET #0.

The network node 900 transmits a PDCCH transmission in the CORESET in accordance with a CCE-REG mapping (step 904). The PDCCH transmission includes one or more CCEs, but in most cases includes multiple CCEs. The CCE-REG mapping includes: (a) an interleaved portion that maps the CCE(s) of the PDCCH transmission to a first set of REGs that span a bandwidth of the CORESET (e.g., span a full bandwidth of the CORESET or at least some portion of the full bandwidth that is greater than the bandwidth supported by the reduced bandwidth UE 212) and (b) a second portion that maps at least a portion of an additional CCE to at least a REG in a frequency gap between two REGs in the first set of REGs. The additional CCE corresponds to (e.g., is a copy of) one of the CCE(s) mapped to the first set of REGs by the interleaved portion of the CCE-REG mapping. For example, in the case of the reduced bandwidth UE 212, the additional CCE is a copy of a CCE that falls outside of the portion of the CORESET bandwidth supported by the reduced bandwidth UE 212. Note that the additional CCE is part of (i.e., included in) the PDCCH transmission.

In one embodiment, the CCE(s) comprised in the PDCCH transmission consist of multiple CCEs, the interleaved portion maps the CCEs to the first set of REGs that are spread across the bandwidth of the CORESET, and the second portion maps the additional CCE to REGs in one or more frequency gaps between REGs in the first set of REGs. Again, the additional CCE corresponds to (e.g., is a copy of) one of the CCEs mapped to the first set of REGs by the interleaved portion of the CCE to REG mapping.

In one embodiment, the interleaved portion of the CCE-REG mapping maps each of the one or more CCEs to six REGs.

In one embodiment, the CCE-REG mapping uses a REG bundle size of six. Note that using a REG bundle of size N (e.g., N=6) means that the REGs are bundled together in groups of N REGs, such that the interleaved portion of the CCE-REG mapping causes gaps between the REG bundles (in the frequency domain) but not between the N REGs within a REG bundle.

In one embodiment, the at least a portion of the additional CCE mapped by the second portion of the CCE-REG mapping is a copy of a corresponding at least a portion of one of the CCEs mapped by the interleaved portion of the CCE-REG mapping, wherein the corresponding at least a portion is mapped by the interleaved portion of the CCE-REG mapping to one or more REGs comprising at least one REG located outside a bandwidth supported by the reduced bandwidth UE 212. Note that this is one way to express what is shown in the examples shown in FIGS. 7 and 8 and described above (but those examples only show entire CCEs, but the same concept can be used for portion(s) of CCE(s)).

In one embodiment, the at least a portion of the additional CCE mapped by the second portion of the CCE to REG mapping is a copy of a corresponding at least a portion of one of the CCEs mapped by the interleaved portion of the CCE to REG mapping, wherein the corresponding at least a portion is mapped by the interleaved portion of the CCE-REG mapping to one or more REGs comprising at least one REG located within a bandwidth supported by the reduced bandwidth UE 212. In one embodiment, the at least one REG located within the bandwidth supported by the reduced bandwidth UE 212 is a REG adjacent to the frequency gap.

In one embodiment, the CCE-REG mapping is a non-interleaved CCE-REG mapping. For example, the combination of the interleaved portion and the second portion of the CCE-REG mapping provides a non-interleaved CCE-REG mapping within the bandwidth supported by the reduced bandwidth UE 212.

In one embodiment, the second portion of the CCE-REG mapping maps one or more additional CCEs to REGs in one or more frequency gaps between REGs in the first set of REGs so that the CCEs of the PDCCH transmission (i.e., the one or more CCEs mapped by the interleaved portion of the CCE-REG mapping and the one or more additional CCEs mapped by the second portion of the CCE-REG mapping) are mapped by the CCE-REG mapping to contiguous REGs (in the frequency domain), at least up to a frequency threshold. Note that, after the frequency threshold, there may be no need to copy additional CCEs into the bandwidth supported by the bandwidth reduced UE 212 (e.g., because all CCEs are already included in this bandwidth).

In one embodiment, the CORESET is employed for scheduling system information, and/or employed for initial access, and/or is a CORESET #0.

In one embodiment, the first set of REGs to which the interleaved portion of the CCE to REG mapping maps the one or more CCEs comprises (e.g., and may consist of) REGs in one or more symbols (time domain OFDM symbols), and the second portion of the CCE to REG mapping maps at least a portion of a second additional CCE to one or more REGs comprising at least one REG in a symbol other than the one or more symbols, the second additional CCE corresponding to another one of the one or more CCEs.

In one embodiment, the CCE(s) comprised in the PDCCH transmission consist of multiple CCEs, and, within a bandwidth supported by the reduced bandwidth UE 212, together, the interleaved portion of the CCE-REG mapping and the second portion of the CCE-REG mapping map the CCEs to contiguous REGs within the bandwidth supported by the reduced bandwidth UE 212. In one embodiment, an ordering of the CCEs within the bandwidth supported by the reduced bandwidth UE 212 is the same as an ordering of the CCEs in the interleaved portion of the CCE-REG mapping. In another embodiment, an ordering of the CCEs within the bandwidth supported by the reduced bandwidth UE 212 is different than an ordering of the CCEs in the interleaved portion of the CCE-REG mapping.

In one embodiment, the CCE to REG mapping is a function of one or more parameters, the one or more parameters comprising: (a) a bandwidth of the reduced bandwidth UE 212 to which the PDCCH transmission is transmitted, (b) a cell identity or information that indicates at least a portion of the cell identity, of a cell in which the PDCCH transmission is received, (c) a number of aggregation levels used for the PDCCH transmission, (d) or any combination of two or more of (a)-(c).

At the reduced bandwidth UE 212, the PDCCH transmission is received and decoded in accordance with at least a portion of the CCE-REG mapping (step 906). In particular, the reduced bandwidth UE 212 uses a combination of a portion of the interleaved portion of the CCE-REG mapping that corresponds to REGs that are within its supported bandwidth and the second portion of the CCE-REG mapping to form a new CCE-REG mapping for the reduced bandwidth UE 212. The reduced bandwidth UE 212 may ignore (or may not even be aware of) the portion of the interleaved portion of the CCE-REG mapping that corresponds to REGs that are outside of its supported bandwidth.

In one alternative embodiment, the reduced bandwidth UE 212 is instead a UE 212 that supports a bandwidth of the CORESET. In this case, the UE 212 may receive and decode the PDCCH transmission using all of the CCEs included in the CCE-REG mapping. Note that the additional CCE(s), or portion(s) of the additional CCE(s), mapped by the second portion of the CCE-REG mapping may be used by the UE 212 for any desired purpose such as, e.g., to improve decoding. The redundancy provided by the additional CCE(s) may for example increase coverage or decoding performance of the UE 212.

In one embodiment, the reduced bandwidth UE 212 supports a portion of the bandwidth of the CORESET, the CCE(s) comprised in the PDCCH transmission consist of multiple CCEs, and receiving and decoding the PDCCH transmission comprises receiving and decoding the PDCCH transmission using: (i) a portion of the CCEs mapped by the interleaved portion of the CCE-REG mapping to REGs that are within the portion of the bandwidth of the CORESET supported by the reduced bandwidth UE 212 and (ii) the at least a portion of the additional CCE mapped by the second portion of the CCE-REG mapping to the at least a REG in the frequency gap.

In one embodiment, the interleaved portion of the CCE to REG mapping is used in a legacy system.

In one embodiment, receiving and decoding the PDCCH transmission comprises determining the at least a portion of the CCE-REG mapping (step 906A).

Figure 10:
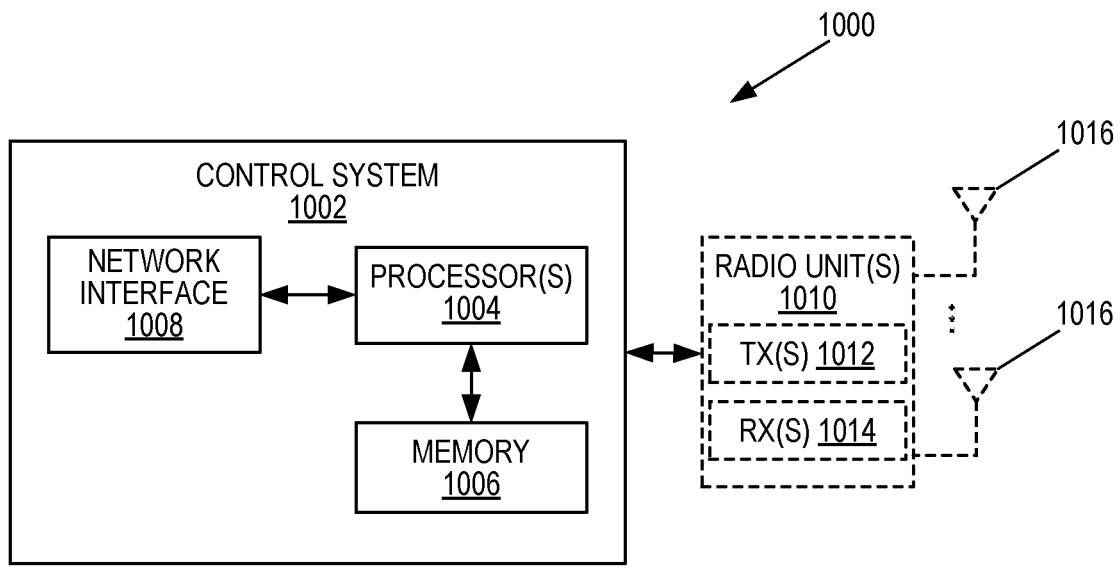

FIG. 10 is a schematic block diagram of a network node 1000 according to some embodiments of the present disclosure. Optional features are represented by dashed boxes. The network node 1000 may be, for example, the network node 900, a base station 202 or 206, or a network node that implements all or part of the functionality of the base station 202 or gNB described herein. As illustrated, the network node 1000 includes a control system 1002 that includes one or more processors 1004 (e.g., Central Processing Units (CPUs), Application Specific Integrated Circuits (ASICs), Field Programmable Gate Arrays (FPGAs), and/or the like), memory 1006, and a network interface 1008. The one or more processors 1004 are also referred to herein as processing circuitry. In addition, the network node 1000 may include one or more radio units 1010 that each includes one or more transmitters 1012 and one or more receivers 1014 coupled to one or more antennas 1016. The radio units 1010 may be referred to or be part of radio interface circuitry. In some embodiments, the radio unit(s) 1010 is external to the control system 1002 and connected to the control system 1002 via, e.g., a wired connection (e.g., an optical cable). However, in some other embodiments, the radio unit(s) 1010 and potentially the antenna(s) 1016 are integrated together with the control system 1002. The one or more processors 1004 operate to provide one or more functions of the network node 1000 as described herein (e.g., one or more functions of the network node 900, a gNB, or base station 202 described above, e.g., with respect to FIG. 9). In some embodiments, the function(s) are implemented in software that is stored, e.g., in the memory 1006 and executed by the one or more processors 1004.

FIG. 11 is a schematic block diagram that illustrates a virtualized embodiment of the network node 1000 according to some embodiments of the present disclosure. Again, optional features are represented by dashed boxes. As used herein, a "virtualized" network node is an implementation of the network node 1000 in which at least a portion of the functionality of the network node 1000 is implemented as a virtual component(s) (e.g., via a virtual machine(s) executing on a physical processing node(s) in a network(s)). As illustrated, in this example, the network node 1000 may include the control system 1002 and/or the one or more radio units 1010, as described above. The control system 1002 may be connected to the radio unit(s) 1010 via, for example, an optical cable or the like. The network node 1000 includes one or more processing nodes 1100 coupled to or included as part of a network(s) 1102. If present, the control system 1002 or the radio unit(s) are connected to the processing node(s) 1100 via the network 1102. Each processing node 1100 includes one or more processors 1104 (e.g., CPUs, ASICs, FPGAs, and/or the like), memory 1106, and a network interface 1108.

In this example, functions 1110 of the network node 1000 described herein (e.g., one or more functions of the network node 900, a gNB, or base station 202 described above, e.g., with respect to FIG. 9) are implemented at the one or more processing nodes 1100 or distributed across the one or more processing nodes 1100 and the control system 1002 and/or the radio unit(s) 1010 in any desired manner. In some particular embodiments, some or all of the functions 1110 of the network node 1000 described herein are implemented as virtual components executed by one or more virtual machines implemented in a virtual environment(s) hosted by the processing node(s) 1100. As will be appreciated by one of ordinary skill in the art, additional signaling or communication between the processing node(s) 1100 and the control system 1002 is used in order to carry out at least some of the desired functions 1110. Notably, in some embodiments, the control system 1002 may not be included, in which case the radio unit(s) 1010 communicate directly with the processing node(s) 1100 via an appropriate network interface(s).

In some embodiments, a computer program including instructions which, when executed by at least one processor, causes the at least one processor to carry out the functionality of the network node 1000 or a node (e.g., a processing node 1100) implementing one or more of the functions 1110 of the network node 1000 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 12:
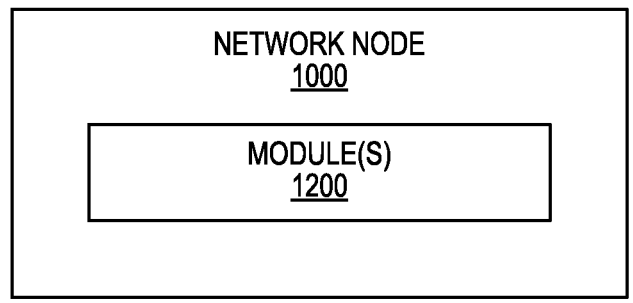

FIG. 12 is a schematic block diagram of the network node 1000 according to some other embodiments of the present disclosure. The network node 1000 includes one or more modules 1200, each of which is implemented in software. The module(s) 1200 provide the functionality of the network node 1000 described herein (e.g., one or more functions of the network node 900, a gNB, or base station 202 described above, e.g., with respect to FIG. 9). This discussion is equally applicable to the processing node 1100 of FIG. 11 where the modules 1200 may be implemented at one of the processing nodes 1100 or distributed across multiple processing nodes 1100 and/or distributed across the processing node(s) 1100 and the control system 1002.

Figure 13:
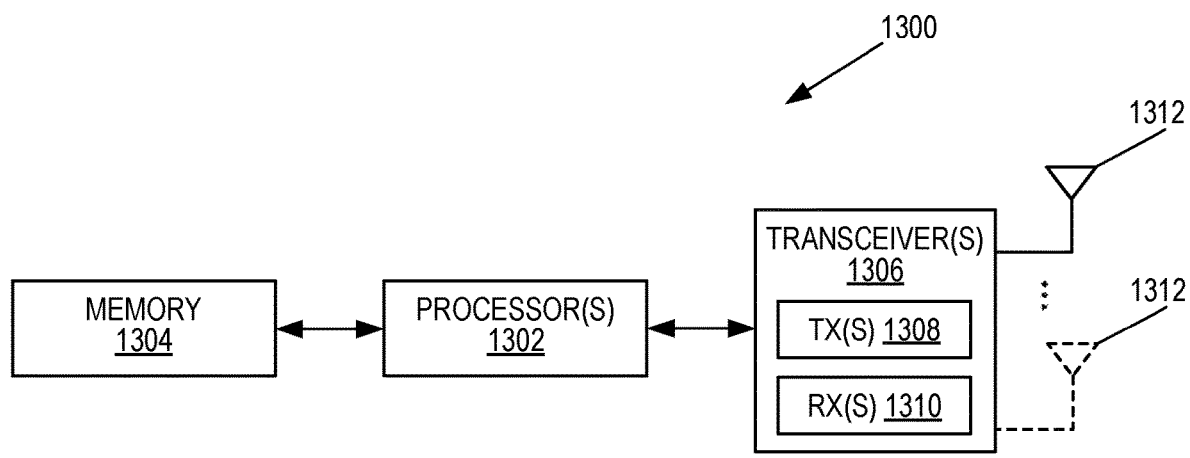
FIGS. 13 and 14 are schematic block diagrams of example embodiments of a wireless communication device.

FIG. 13 is a schematic block diagram of a wireless communication device 1300 according to some embodiments of the present disclosure. The wireless communication device 1300 may be a UE 212 such as, e.g., a reduced bandwidth wireless communication device or a reduced bandwidth UE, as described above. As illustrated, the wireless communication device 1300 includes one or more processors 1302 (e.g., CPUs, ASICs, FPGAs, and/or the like), memory 1304, and one or more transceivers 1306 each including one or more transmitters 1308 and one or more receivers 1310 coupled to one or more antennas 1312. The transceiver(s) 1306 includes radio-front end circuitry connected to the antenna(s) 1312 that is configured to condition signals communicated between the antenna(s) 1312 and the processor(s) 1302, as will be appreciated by on of ordinary skill in the art. The processors 1302 are also referred to herein as processing circuitry. The transceivers 1306 are also referred to herein as radio circuitry. In some embodiments, the functionality of the wireless communication device 1300 described above (e.g., one or more functions of a reduced bandwidth UE, a NR Red-Cap UE, a reduced bandwidth wireless communication device, or a wireless device 212 described above, e.g., with respect to FIG. 9) may be fully or partially implemented in software that is, e.g., stored in the memory 1304 and executed by the processor(s) 1302. Note that the wireless communication device 1300 may include additional components not illustrated in FIG. 13 such as, e.g., one or more user interface components (e.g., an input/output interface including a display, buttons, a touch screen, a microphone, a speaker(s), and/or the like and/or any other components for allowing input of information into the wireless communication device 1300 and/or allowing output of information from the wireless communication device 1300), a power supply (e.g., a battery and associated power circuitry), etc.

In some embodiments, a computer program including instructions which, when executed by at least one processor, causes the at least one processor to carry out the functionality of the wireless communication device 1300 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 14:
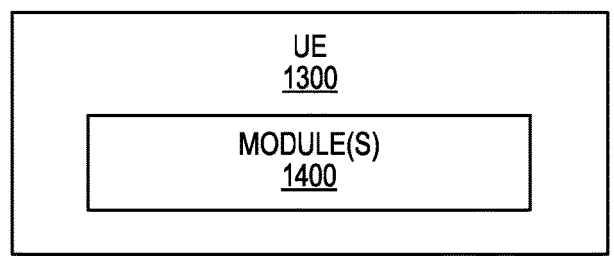

FIG. 14 is a schematic block diagram of the wireless communication device 1300 according to some other embodiments of the present disclosure. The wireless communication device 1300 includes one or more modules 1400, each of which is implemented in software. The module(s) 1400 provide the functionality of the wireless communication device 1300 described herein (e.g., one or more functions of a reduced bandwidth UE, a NR Red-Cap UE, a reduced bandwidth wireless communication device, or a wireless device 212 described above, e.g., with respect to FIG. 9).

Figure 15:
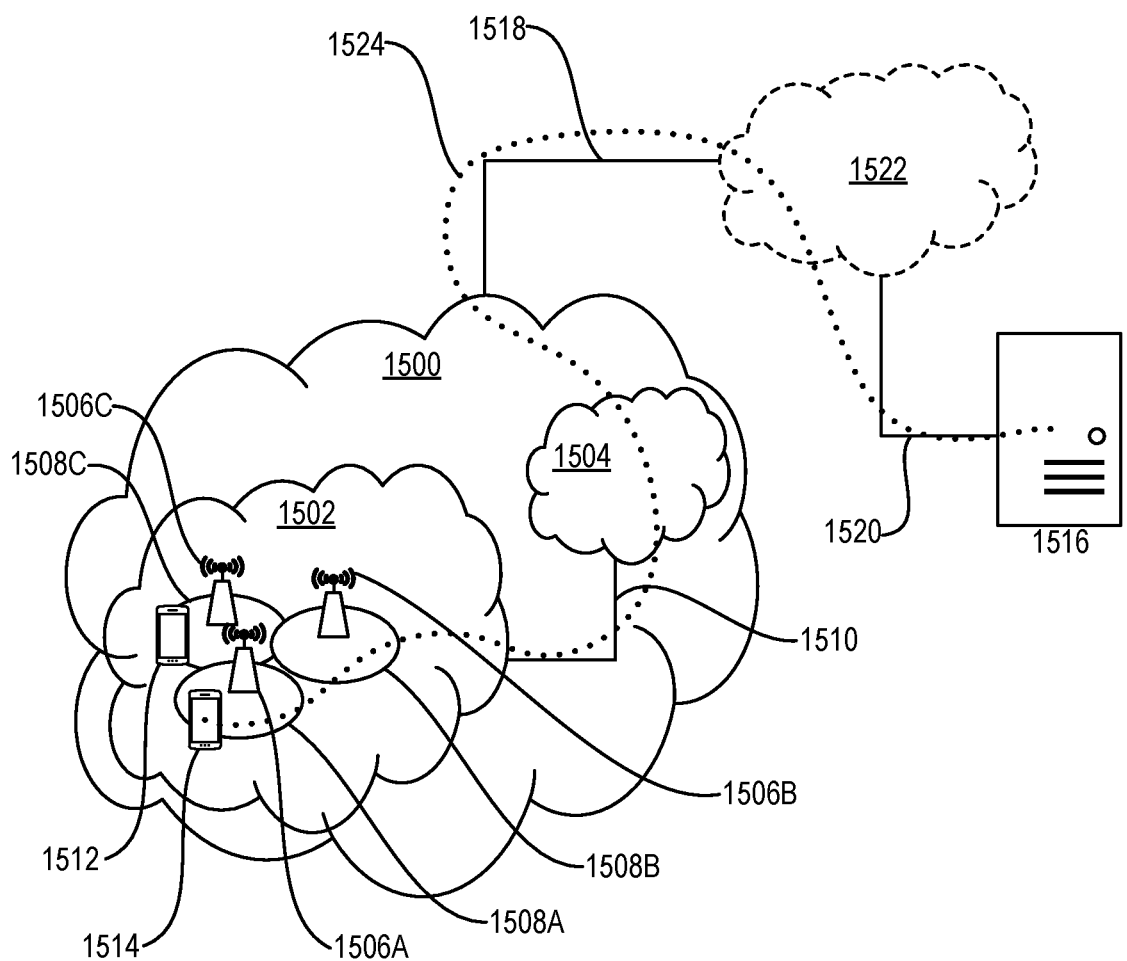
FIG. 15 illustrates an example embodiment of a communication system in which embodiments of the present disclosure may be implemented.

With reference to FIG. 15, in accordance with an embodiment, a communication system includes a telecommunication network 1500, such as a 3GPP-type cellular network, which comprises an access network 1502, such as a RAN, and a core network 1504. The access network 1502 comprises a plurality of base stations 1506A, 1506B, 1506C, such as Node Bs, eNBs, gNBs, or other types of wireless Access Points (APs), each defining a corresponding coverage area 1508A, 1508B, 1508C. Each base station 1506A, 1506B, 1506C is connectable to the core network 1504 over a wired or wireless connection 1510. A first UE 1512 located in coverage area 1508C is configured to wirelessly connect to, or be paged by, the corresponding base station 1506C. A second UE 1514 in coverage area 1508A is wirelessly connectable to the corresponding base station 1506A. While a plurality of UEs 1512, 1514 are illustrated in this example, the disclosed embodiments are equally applicable to a situation where a sole UE is in the coverage area or where a sole UE is connecting to the corresponding base station 1506.

The telecommunication network 1500 is itself connected to a host computer 1516, which may be embodied in the hardware and/or software of a standalone server, a cloud-implemented server, a distributed server, or as processing resources in a server farm. The host computer 1516 may be under the ownership or control of a service provider, or may be operated by the service provider or on behalf of the service provider. Connections 1518 and 1520 between the telecommunication network 1500 and the host computer 1516 may extend directly from the core network 1504 to the host computer 1516 or may go via an optional intermediate network 1522. The intermediate network 1522 may be one of, or a combination of more than one of, a public, private, or hosted network; the intermediate network 1522, if any, may be a backbone network or the Internet; in particular, the intermediate network 1522 may comprise two or more sub-networks (not shown).

The communication system of FIG. 15 as a whole enables connectivity between the connected UEs 1512, 1514 and the host computer 1516. The connectivity may be described as an Over-the-Top (OTT) connection 1524. The host computer 1516 and the connected UEs 1512, 1514 are configured to communicate data and/or signaling via the OTT connection 1524, using the access network 1502, the core network 1504, any intermediate network 1522, and possible further infrastructure (not shown) as intermediaries. The OTT connection 1524 may be transparent in the sense that the participating communication devices through which the OTT connection 1524 passes are unaware of routing of uplink and downlink communications. For example, the base station 1506 may not or need not be informed about the past routing of an incoming downlink communication with data originating from the host computer 1516 to be forwarded (e.g., handed over) to a connected UE 1512. Similarly, the base station 1506 need not be aware of the future routing of an outgoing uplink communication originating from the UE 1512 towards the host computer 1516.

Example implementations, in accordance with an embodiment, of the UE, base station, and host computer discussed in the preceding paragraphs will now be described with reference to FIG. 16. In a communication system 1600, a host computer 1602 comprises hardware 1604 including a communication interface 1606 configured to set up and maintain a wired or wireless connection with an interface of a different communication device of the communication system 1600. The host computer 1602 further comprises processing circuitry 1608, which may have storage and/or processing capabilities. In particular, the processing circuitry 1608 may comprise one or more programmable processors, ASICs, FPGAs, or combinations of these (not shown) adapted to execute instructions. The host computer 1602 further comprises software 1610, which is stored in or accessible by the host computer 1602 and executable by the processing circuitry 1608. The software 1610 includes a host application 1612. The host application 1612 may be operable to provide a service to a remote user, such as a UE 1614 connecting via an OTT connection 1616 terminating at the UE 1614 and the host computer 1602. In providing the service to the remote user, the host application 1612 may provide user data which is transmitted using the OTT connection 1616.

The communication system 1600 further includes a base station 1618 provided in a telecommunication system and comprising hardware 1620 enabling it to communicate with the host computer 1602 and with the UE 1614. The hardware 1620 may include a communication interface 1622 for setting up and maintaining a wired or wireless connection with an interface of a different communication device of the communication system 1600, as well as a radio interface 1624 for setting up and maintaining at least a wireless connection 1626 with the UE 1614 located in a coverage area (not shown in FIG. 16) served by the base station 1618. The communication interface 1622 may be configured to facilitate a connection 1628 to the host computer 1602. The connection 1628 may be direct or it may pass through a core network (not shown in FIG. 16) of the telecommunication system and/or through one or more intermediate networks outside the telecommunication system. In the embodiment shown, the hardware 1620 of the base station 1618 further includes processing circuitry 1630, which may comprise one or more programmable processors, ASICs, FPGAs, or combinations of these (not shown) adapted to execute instructions. The base station 1618 further has software 1632 stored internally or accessible via an external connection.

The communication system 1600 further includes the UE 1614 already referred to. The UE's 1614 hardware 1634 may include a radio interface 1636 configured to set up and maintain a wireless connection 1626 with a base station serving a coverage area in which the UE 1614 is currently located. The hardware 1634 of the UE 1614 further includes processing circuitry 1638, which may comprise one or more programmable processors, ASICs, FPGAs, or combinations of these (not shown) adapted to execute instructions. The UE 1614 further comprises software 1640, which is stored in or accessible by the UE 1614 and executable by the processing circuitry 1638. The software 1640 includes a client application 1642. The client application 1642 may be operable to provide a service to a human or non-human user via the UE 1614, with the support of the host computer 1602. In the host computer 1602, the executing host application 1612 may communicate with the executing client application 1642 via the OTT connection 1616 terminating at the UE 1614 and the host computer 1602. In providing the service to the user, the client application 1642 may receive request data from the host application 1612 and provide user data in response to the request data. The OTT connection 1616 may transfer both the request data and the user data. The client application 1642 may interact with the user to generate the user data that it provides.

Figure 16:
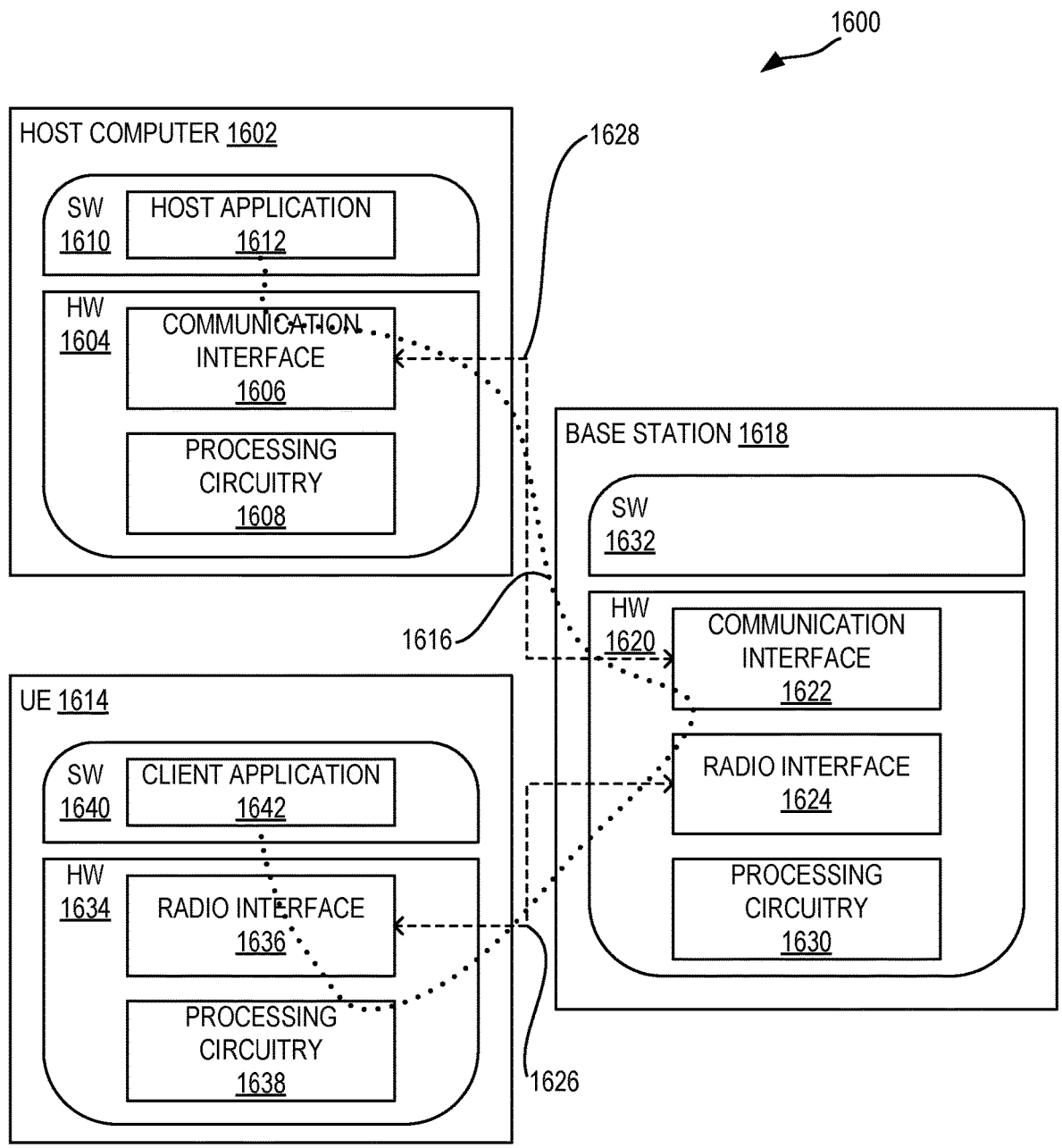
FIG. 16 illustrates example embodiments of the host computer, base station, and UE of FIG. 15.

It is noted that the host computer 1602, the base station 1618, and the UE 1614 illustrated in FIG. 16 may be similar or identical to the host computer 1516, one of the base stations 1506A, 1506B, 1506C, and one of the UEs 1512, 1514 of FIG. 15, respectively. This is to say, the inner workings of these entities may be as shown in FIG. 16 and independently, the surrounding network topology may be that of FIG. 15.

In FIG. 16, the OTT connection 1616 has been drawn abstractly to illustrate the communication between the host computer 1602 and the UE 1614 via the base station 1618 without explicit reference to any intermediary devices and the precise routing of messages via these devices. The network infrastructure may determine the routing, which may be configured to hide from the UE 1614 or from the service provider operating the host computer 1602, or both. While the OTT connection 1616 is active, the network infrastructure may further take decisions by which it dynamically changes the routing (e.g., on the basis of load balancing consideration or reconfiguration of the network).

The wireless connection 1626 between the UE 1614 and the base station 1618 is in accordance with the teachings of the embodiments described throughout this disclosure. One or more of the various embodiments improve the performance of OTT services provided to the UE 1614 using the OTT connection 1616, in which the wireless connection 1626 forms the last segment.

A measurement procedure may be provided for the purpose of monitoring data rate, latency, and other factors on which the one or more embodiments improve. There may further be an optional network functionality for reconfiguring the OTT connection 1616 between the host computer 1602 and the UE 1614, in response to variations in the measurement results. The measurement procedure and/or the network functionality for reconfiguring the OTT connection 1616 may be implemented in the software 1610 and the hardware 1604 of the host computer 1602 or in the software 1640 and the hardware 1634 of the UE 1614, or both. In some embodiments, sensors (not shown) may be deployed in or in association with communication devices through which the OTT connection 1616 passes; the sensors may participate in the measurement procedure by supplying values of the monitored quantities exemplified above, or supplying values of other physical quantities from which the software 1610, 1640 may compute or estimate the monitored quantities. The reconfiguring of the OTT connection 1616 may include message format, retransmission settings, preferred routing, etc.; the reconfiguring need not affect the base station 1618, and it may be unknown or imperceptible to the base station 1618. Such procedures and functionalities may be known and practiced in the art. In certain embodiments, measurements may involve proprietary UE signaling facilitating the host computer 1602's measurements of throughput, propagation times, latency, and the like. The measurements may be implemented in that the software 1610 and 1640 causes messages to be transmitted, in particular empty or 'dummy' messages, using the OTT connection 1616 while it monitors propagation times, errors, etc.

Figures 17, 18:
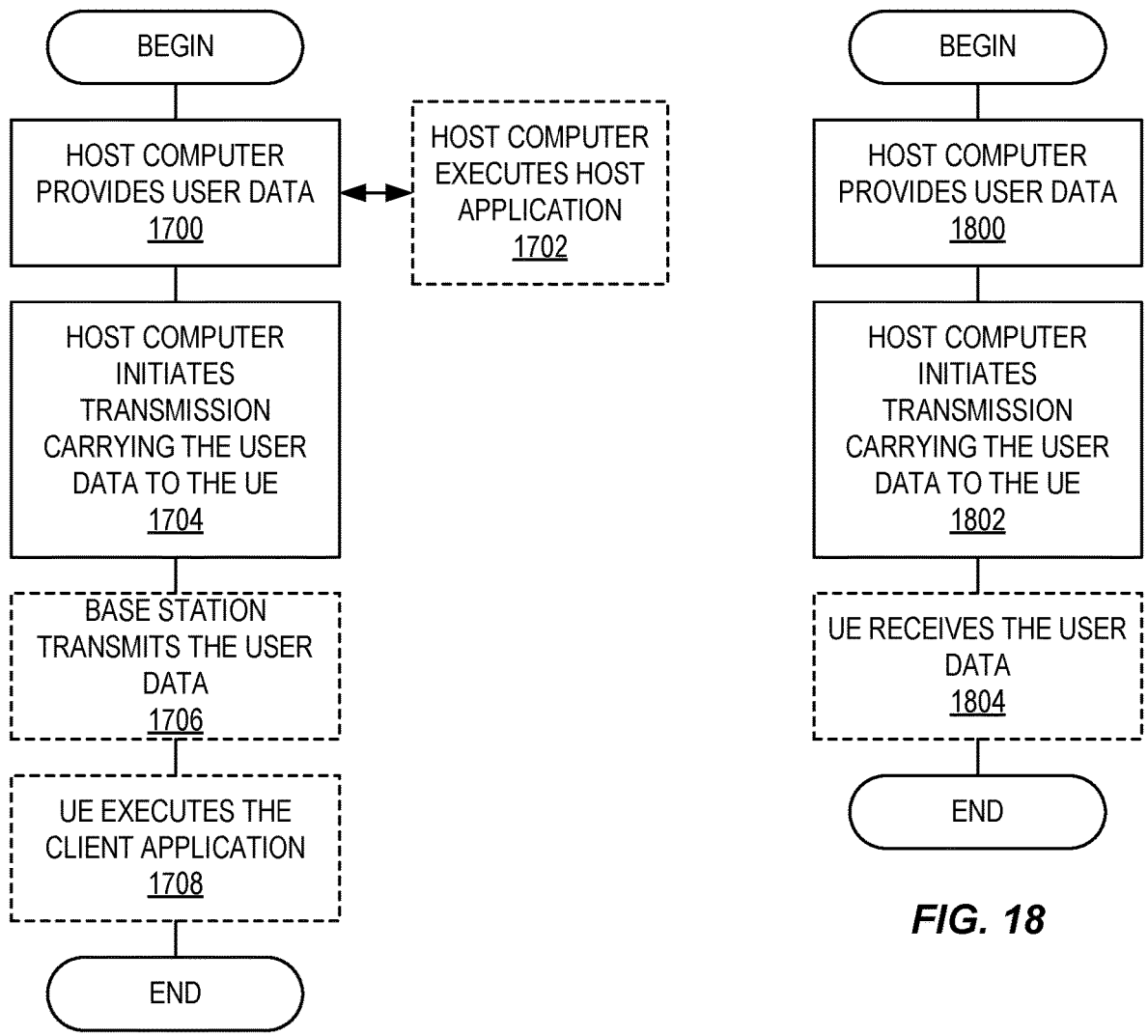
FIGS. 17 through 20 are flow charts that illustrate example embodiments of methods implemented in a communication system such as that of FIG. 15.

FIG. 17 is a flowchart illustrating a method implemented in a communication system, in accordance with one embodiment. The communication system includes a host computer, a base station, and a UE which may be those described with reference to FIGS. 15 and 16. For simplicity of the present disclosure, only drawing references to FIG. 17 will be included in this section. In step 1700, the host computer provides user data. In sub-step 1702 (which may be optional) of step 1700, the host computer provides the user data by executing a host application. In step 1704, the host computer initiates a transmission carrying the user data to the UE. In step 1706 (which may be optional), the base station transmits to the UE the user data which was carried in the transmission that the host computer initiated, in accordance with the teachings of the embodiments described throughout this disclosure. In step 1708 (which may also be optional), the UE executes a client application associated with the host application executed by the host computer.

FIG. 18 is a flowchart illustrating a method implemented in a communication system, in accordance with one embodiment. The communication system includes a host computer, a base station, and a UE which may be those described with reference to FIGS. 15 and 16. For simplicity of the present disclosure, only drawing references to FIG. 18 will be included in this section. In step 1800 of the method, the host computer provides user data. In an optional sub-step (not shown) the host computer provides the user data by executing a host application. In step 1802, the host computer initiates a transmission carrying the user data to the UE. The transmission may pass via the base station, in accordance with the teachings of the embodiments described throughout this disclosure. In step 1804 (which may be optional), the UE receives the user data carried in the transmission.

Figures 19, 20:
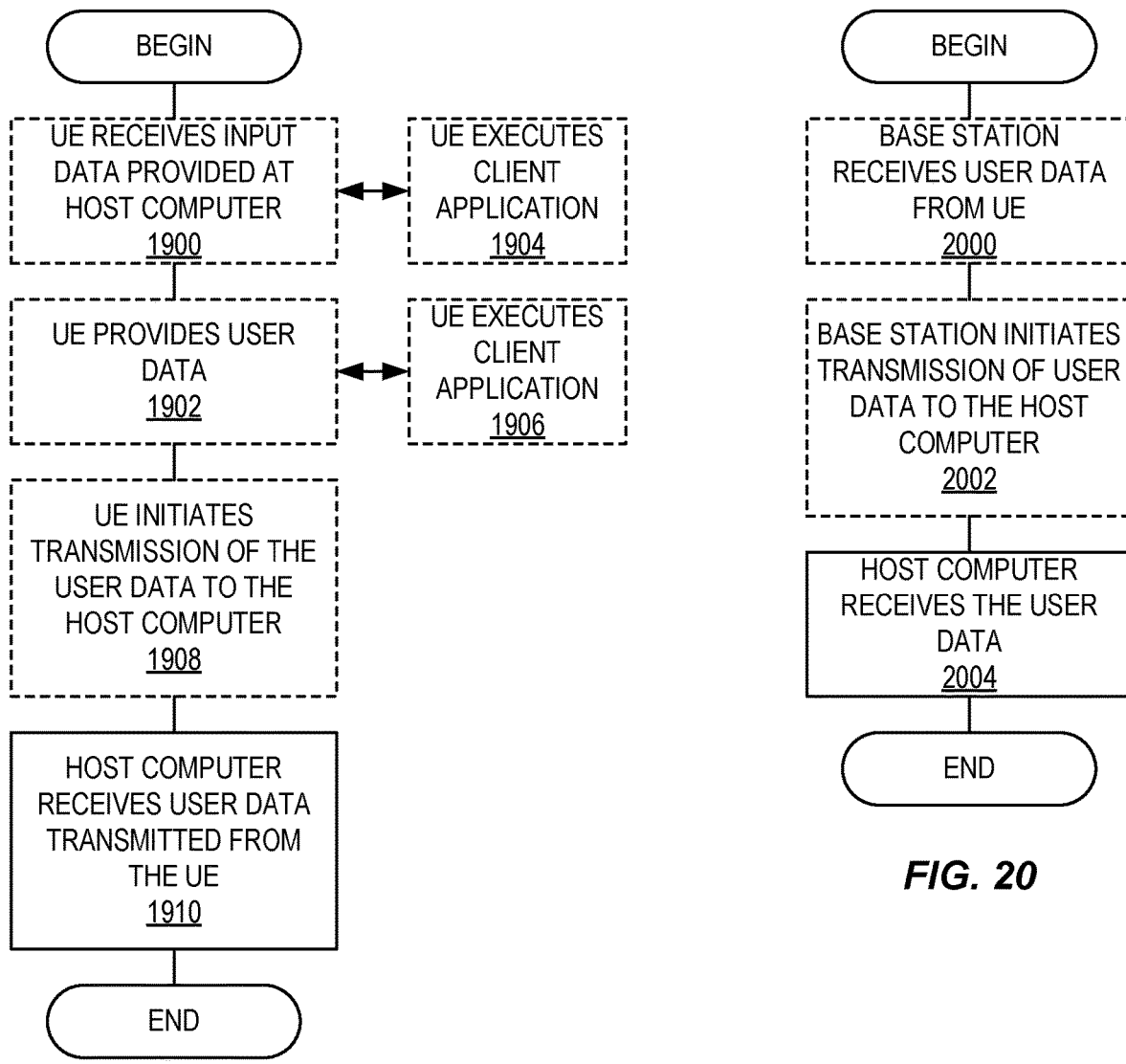

FIG. 19 is a flowchart illustrating a method implemented in a communication system, in accordance with one embodiment. The communication system includes a host computer, a base station, and a UE which may be those described with reference to FIGS. 15 and 16. For simplicity of the present disclosure, only drawing references to FIG. 19 will be included in this section. In step 1900 (which may be optional), the UE receives input data provided by the host computer. Additionally or alternatively, in step 1902, the UE provides user data. In sub-step 1904 (which may be optional) of step 1900, the UE provides the user data by executing a client application. In sub-step 1906 (which may be optional) of step 1902, the UE executes a client application which provides the user data in reaction to the received input data provided by the host computer. In providing the user data, the executed client application may further consider user input received from the user. Regardless of the specific manner in which the user data was provided, the UE initiates, in sub-step 1908 (which may be optional), transmission of the user data to the host computer. In step 1910 of the method, the host computer receives the user data transmitted from the UE, in accordance with the teachings of the embodiments described throughout this disclosure.

FIG. 20 is a flowchart illustrating a method implemented in a communication system, in accordance with one embodiment. The communication system includes a host computer, a base station, and a UE which may be those described with reference to FIGS. 15 and 16. For simplicity of the present disclosure, only drawing references to FIG. 20 will be included in this section. In step 2000 (which may be optional), in accordance with the teachings of the embodiments described throughout this disclosure, the base station receives user data from the UE. In step 2002 (which may be optional), the base station initiates transmission of the received user data to the host computer. In step 2004 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Embodiments of the present disclosure are as follows:

Embodiment 1: The method of any of the embodiments of a method performed by a wireless communication disclosed herein (or claimed in the Claims below), further comprising: providing user data; and forwarding the user data to a host computer via the transmission to the base station.

Embodiment 2: The method of any of the embodiments of a method performed by a base station or network node disclosed herein (or claimed in the Claims below), further comprising: obtaining user data; and forwarding the user data to a host computer or a wireless communication device.

Embodiment 3: A wireless communication device comprising: processing circuitry configured to perform any of the steps of any of the embodiments of a method performed by a wireless communication device disclosed herein (or claimed in the Claims below); and power supply circuitry configured to supply power to the wireless communication device.

Embodiment 4: A network node comprising: processing circuitry configured to perform any of the steps of any of the embodiments of a method performed by a base station or network node disclosed herein (or claimed in the Claims below); and power supply circuitry configured to supply power to the network node.

Embodiment 5: A wireless communication device comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the embodiments of a method performed by a wireless communication device disclosed herein (or claimed in the Claims below); an input interface connected to the processing circuitry and configured to allow input of information into the wireless communication device to be processed by the processing circuitry; an output interface connected to the processing circuitry and configured to output information from the wireless communication device that has been processed by the processing circuitry; and a battery connected to the processing circuitry and configured to supply power to the wireless communication device.

Embodiment 6: A communication system including a host computer comprising: processing circuitry configured to provide user data; and a communication interface configured to forward the user data to a cellular network for transmission to a wireless communication device; wherein the cellular network comprises a network node having a radio interface and processing circuitry, the network node's processing circuitry configured to perform any of the steps of any of the embodiments of a method performed by a base station or network node disclosed herein (or claimed in the Claims below).

Embodiment 7: The communication system of the previous embodiment further including the network node.

Embodiment 8: The communication system of the previous 2 embodiments, further including the wireless communication device, wherein the wireless communication device is configured to communicate with the network node.

Embodiment 9: The communication system of the previous 3 embodiments, wherein: the processing circuitry of the host computer is configured to execute a host application, thereby providing the user data; and the wireless communication device comprises processing circuitry configured to execute a client application associated with the host application.

Embodiment 10: A method implemented in a communication system including a host computer, a network node, and a wireless communication device, the method comprising: at the host computer, providing user data; and at the host computer, initiating a transmission carrying the user data to the wireless communication device via a cellular network comprising the network node, wherein the network node performs any of the steps of any of the embodiments of a method performed by a base station or network node disclosed herein (or claimed in the Claims below).

Embodiment 11: The method of the previous embodiment, further comprising, at the network node, transmitting the user data.

Embodiment 12: The method of the previous 2 embodiments, wherein the user data is provided at the host computer by executing a host application, the method further comprising, at the wireless communication device, executing a client application associated with the host application.

Embodiment 13: A wireless communication device configured to communicate with a network node, the wireless communication device comprising a radio interface and processing circuitry configured to perform the method of the previous 3 embodiments.

Embodiment 14: A communication system including a host computer comprising: processing circuitry configured to provide user data; and a communication interface configured to forward user data to a cellular network for transmission to a wireless communication device; wherein the wireless communication device comprises a radio interface and processing circuitry, the wireless communication device's components configured to perform any of the steps of any of the embodiments of a method performed by a wireless communication device disclosed herein (or claimed in the Claims below).

Embodiment 15: The communication system of the previous embodiment, wherein the cellular network further includes a network node configured to communicate with the wireless communication device.

Embodiment 16: The communication system of the previous 2 embodiments, wherein: the processing circuitry of the host computer is configured to execute a host application, thereby providing the user data; and the wireless communication device's processing circuitry is configured to execute a client application associated with the host application.

Embodiment 17: A method implemented in a communication system including a host computer, a network node, and a wireless communication device, the method comprising: at the host computer, providing user data; and at the host computer, initiating a transmission carrying the user data to the wireless communication device via a cellular network comprising the network node, wherein the wireless communication device performs any of the steps of any of the embodiments of a method performed by a wireless communication device disclosed herein (or claimed in the Claims below).

Embodiment 18: The method of the previous embodiment, further comprising at the wireless communication device, receiving the user data from the network node.

Embodiment 19: A communication system including a host computer comprising: communication interface configured to receive user data originating from a transmission from a wireless communication device to a network node; wherein the wireless communication device comprises a radio interface and processing circuitry, the wireless communication device's processing circuitry configured to perform any of the steps of any of the embodiments of a method performed by a wireless communication device disclosed herein (or claimed in the Claims below).

Embodiment 20: The communication system of the previous embodiment, further including the wireless communication device.

Embodiment 21: The communication system of the previous 2 embodiments, further including the network node, wherein the network node comprises a radio interface configured to communicate with the wireless communication device and a communication interface configured to forward to the host computer the user data carried by a transmission from the wireless communication device to the network node.

Embodiment 22: The communication system of the previous 3 embodiments, wherein: the processing circuitry of the host computer is configured to execute a host application; and the wireless communication device's processing circuitry is configured to execute a client application associated with the host application, thereby providing the user data.

Embodiment 23: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 24: A method implemented in a communication system including a host computer, a network node, and a wireless communication device, the method comprising: at the host computer, receiving user data transmitted to the network node from the wireless communication device, wherein the wireless communication device performs any of the steps of any of the embodiments of a method performed by a wireless device communication disclosed herein (or claimed in the Claims below).

Embodiment 25: The method of the previous embodiment, further comprising, at the wireless communication device, providing the user data to the network node.

Embodiment 26: The method of the previous 2 embodiments, further comprising: at the wireless communication device, executing a client application, thereby providing the user data to be transmitted; and at the host computer, executing a host application associated with the client application.

Embodiment 27: The method of the previous 3 embodiments, further comprising: at the wireless communication device, executing a client application; and at the wireless communication device, receiving input data to the client application, the input data being provided at the host computer by executing a host application associated with the client application; wherein the user data to be transmitted is provided by the client application in response to the input data.

Embodiment 28: A communication system including a host computer comprising a communication interface configured to receive user data originating from a transmission from a wireless communication device to a network node, wherein the network node comprises a radio interface and processing circuitry, the network node's processing circuitry configured to perform any of the steps of any of the embodiments of a method performed by a base station or network node disclosed herein (or claimed in the Claims below).

Embodiment 29: The communication system of the previous embodiment further including the network node.

Embodiment 30: The communication system of the previous 2 embodiments, further including the wireless communication device, wherein the wireless communication device is configured to communicate with the network node.

Embodiment 31: The communication system of the previous 3 embodiments, wherein: the processing circuitry of the host computer is configured to execute a host application; and the wireless communication device is configured to execute a client application associated with the host application, thereby providing the user data to be received by the host computer.

Embodiment 32: A method implemented in a communication system including a host computer, a network node, and a wireless communication device, the method comprising: at the host computer, receiving, from the network node, user data originating from a transmission which the network node has received from the wireless communication device, wherein the wireless communication device performs any of the steps of any of the embodiments of a method performed by a wireless communication device disclosed herein (or claimed in the Claims below).

Embodiment 33: The method of the previous embodiment, further comprising at the network node, receiving the user data from the wireless communication device.

Embodiment 34: The method of the previous 2 embodiments, further comprising at the network node, initiating a transmission of the received user data to the host computer.

Those skilled in the art will recognize improvements and modifications to the embodiments of the present disclosure. All such improvements and modifications are considered within the scope of the concepts disclosed herein.

The invention claimed is:

1. A method performed by a wireless communication device, the method comprising:
receiving and decoding a Physical Downlink Control Channel, PDCCH, transmission in a Control Resource Set, CORESET, in accordance with at least a portion of a Control Channel Element, CCE, to Resource Element Group, REG, mapping;
wherein:
the PDCCH transmission comprises one or more CCEs; and
the CCE to REG mapping comprises:
an interleaved portion that maps the one or more CCEs to a first set of REGs that are spread across a bandwidth of the CORESET; and
a second portion that maps at least a portion of an additional CCE to at least a REG in a frequency gap between two REGs in the first set of REGs, the additional CCE corresponding to one of the one or more CCEs mapped to the first set of REGs by the interleaved portion of the CCE to REG mapping, wherein:
the one or more CCEs comprised in the PDCCH transmission consist of a plurality of CCEs;
the interleaved portion maps the plurality of CCEs to the first set of REGs that are spread across the bandwidth of the CORESET; and
the second portion maps the additional CCE to REGs in one or more frequency gaps between REGs in the first set of REGs.

2. The method of claim 1 wherein the at least a portion of the additional CCE is also comprised in the PDCCH transmission.

3. The method of claim 1, wherein the wireless communication device supports the bandwidth of the CORESET.

4. The method of claim 1, wherein:
the wireless communication device supports a portion of the bandwidth of the CORESET;
the one or more CCEs comprised in the PDCCH transmission consist of a plurality of CCEs; and
receiving and decoding the PDCCH transmission comprises receiving and decoding the PDCCH transmission using:
a portion of the plurality of CCEs mapped by the interleaved portion of the CCE to REG mapping to REGs that are within the portion of the bandwidth of the CORESET supported by the wireless communication device; and
the at least a portion of the additional CCE mapped by the second portion of the CCE to REG mapping to the at least a REG in the frequency gap.

5. The method of claim 1, wherein the interleaved portion maps each of the one or more CCEs to six REGs.

6. The method of claim 1, wherein the CCE to REG mapping uses a REG bundle size of six.

7. The method of claim 1, wherein:
the at least a portion of the additional CCE mapped by the second portion of the CCE to REG mapping is a copy of a corresponding at least a portion of said one of the one or more CCEs mapped to the first set of REGs by the interleaved portion of the CCE to REG mapping, wherein said corresponding at least a portion is mapped by the interleaved portion of the CCE to REG mapping to one or more REGs comprising at least one REG located outside a bandwidth supported by the wireless communication device.

8. The method of claim 1, wherein:
the at least a portion of the additional CCE mapped by the second portion of the CCE to REG mapping is a copy of a corresponding at least a portion of said one of the one or more CCEs mapped to the first set of REGs by the interleaved portion of the CCE to REG mapping, wherein said corresponding at least a portion is mapped by the interleaved portion of the CCE to REG mapping to one or more REGs comprising at least one REG located within a bandwidth supported by the wireless communication device;
wherein the at least one REG located within the bandwidth supported by the wireless communication device is a REG adjacent to the frequency gap.

9. The method of claim 1, wherein the CCE to REG mapping is a non-interleaved CCE to REG mapping.

10. The method of claim 1, wherein the second portion of the CCE to REG mapping maps one or more additional CCEs to REGs in one or more frequency gaps between REGs in the first set of REGs spread across the bandwidth of the CORESET so that the CCEs of the PDCCH transmission are mapped by the CCE to REG mapping to contiguous REGs, at least up to a frequency threshold, wherein the one or more additional CCEs correspond to one or more of the CCEs mapped by the interleaved portion of the CCE to REG mapping.

11. The method of claim 1, further comprising receiving information that configures the CORESET.

12. The method of claim 1, wherein the CORESET is:
employed for scheduling system information; and/or
employed for initial access; and/or
is a CORESET #0;
one or more transmitters;
one or more receivers; and
processing circuitry associated with the one or more transmitters and the one or more receivers, the processing circuitry configured to cause the wireless communication device to.

13. The method of claim 1, wherein:
the first set of REGs to which the interleaved portion of the CCE to REG mapping maps the one or more CCEs comprises REGs in one or more symbols; and
the second portion of the CCE to REG mapping maps at least a portion of a second additional CCE to one or more REGs comprising at least one REG in a symbol other than the one or more symbols, the second additional CCE corresponding to another one of the one or more CCEs.

14. The method of claim 1, wherein the interleaved portion of the CCE to REG mapping is used in a legacy system.

15. The method of claim 1, wherein the wireless communication device is a reduced bandwidth device.

16. A wireless communication device comprising:
receive and decode a Physical Downlink Control Channel, PDCCH, transmission in a Control Resource Set, CORESET, in accordance with at least a portion of a Control Channel Element, CCE, to Resource Element Group, REG, mapping;
wherein:
the PDCCH transmission comprises one or more CCEs; and
the CCE to REG mapping comprises:
an interleaved portion that maps the one or more CCEs to a first set of REGs that are spread across a bandwidth of the CORESET; and
a second portion that maps at least a portion of an additional CCE to at least a REG in a frequency gap between two REGs in the first set of REGs, the additional CCE corresponding to one of the one or more CCEs mapped to the first set of REGs by the interleaved portion of the CCE to REG mapping, wherein:

the one or more CCEs comprised in the PDCCH transmission consist of a plurality of CCEs;

the interleaved portion maps the plurality of CCEs to the first set of REGs that are spread across the bandwidth of the CORESET; and the second portion maps the additional CCE to REGs in one or more frequency gaps between REGs in the first set of REGs.

17. A method performed by a network node, the method comprising:

transmitting a Physical Downlink Control Channel, PDCCH, transmission in a Control Resource Set, CORESET, in accordance with a Control Channel Element, CCE, to Resource Element Group, REG, mapping;

wherein:

the PDCCH transmission comprises one or more CCEs; and the CCE to REG mapping comprises:

an interleaved portion that maps the one or more CCEs to a first set of REGs that are spread across a bandwidth of the CORESET; and a second portion that maps at least a portion of an additional CCE to at least a REG in a frequency gap between two REGs in the first set of REGs, the additional CCE corresponding to one of the one or more CCEs mapped to the first set of REGs by the interleaved portion of the CCE to REG mapping, wherein:

the one or more CCEs comprised in the PDCCH transmission consist of a plurality of CCEs;

the interleaved portion maps the plurality of CCEs to the first set of REGs that are spread across the bandwidth of the CORESET; and the second portion maps the additional CCE to REGs in one or more frequency gaps between REGs in the first set of REGs.

18. The method of claim 17 wherein the at least a portion of the additional CCE is also comprised in the PDCCH transmission.

19. A network node comprising processing circuitry configured to cause the network node to:

transmit a Physical Downlink Control Channel, PDCCH, transmission in a Control Resource Set, CORESET, in accordance with a Control Channel Element, CCE, to Resource Element Group, REG, mapping;

wherein:

the PDCCH transmission comprises one or more CCEs; and the CCE to REG mapping comprises:

an interleaved portion that maps the one or more CCEs to a first set of REGs that are spread across a bandwidth of the CORESET; and a second portion that maps at least a portion of an additional CCE to at least a REG in a frequency gap between two REGs in the first set of REGs, the additional CCE corresponding to one of the one or more CCEs mapped to the first set of REGs by the interleaved portion of the CCE to REG mapping, wherein:

the one or more CCEs comprised in the PDCCH transmission consist of a plurality of CCEs;

the interleaved portion maps the plurality of CCEs to the first set of REGs that are spread across the bandwidth of the CORESET; and the second portion maps the additional CCE to REGs in one or more frequency gaps between REGs in the first set of REGs.

* * * * *